(12) United States Patent
Espinosa

(10) Patent No.: US 12,442,176 B2
(45) Date of Patent: Oct. 14, 2025

(54) HYDRAULIC EXPANDABLE CONNECTOR

(71) Applicant: CETRES HOLDINGS, LLC, Jackson, WY (US)

(72) Inventor: Thomas M. Espinosa, Snohomish, WA (US)

(73) Assignee: CETRES HOLDINGS, LLC, Jackson, WY (US)

( * ) Notice: Subject to any disclaimer, the term of this patent is extended or adjusted under 35 U.S.C. 154(b) by 0 days.

(21) Appl. No.: 18/136,669

(22) Filed: Apr. 19, 2023

(65) Prior Publication Data

US 2023/0366194 A1    Nov. 16, 2023

Related U.S. Application Data

(62) Division of application No. 17/359,877, filed on Jun. 28, 2021, now Pat. No. 11,643,805, which is a division of application No. 16/176,869, filed on Oct. 31, 2018, now Pat. No. 11,203,863.

(60) Provisional application No. 62/580,065, filed on Nov. 1, 2017.

(51) Int. Cl.
*E04B 1/26* (2006.01)
*E04B 1/35* (2006.01)

(52) U.S. Cl.
CPC .... *E04B 1/2604* (2013.01); *E04B 2001/2688* (2013.01); *E04B 2001/3583* (2013.01)

(58) Field of Classification Search
CPC ....... E04H 9/14; E04H 9/0215; E04H 9/0235; E04H 9/021; E04B 1/2604; E04B 1/36; E04B 2001/268; E04B 2001/2688; E04B 2001/2692; E04B 2001/2696; E04B 2001/3583

See application file for complete search history.

(56) References Cited

U.S. PATENT DOCUMENTS

| 3,203,717 | A |   | 8/1965 | Jahn |
| 4,246,810 | A | * | 1/1981 | Keske ..................... B25B 29/02 81/57.38 |
| 4,375,181 | A |   | 3/1983 | Conway |

(Continued)

OTHER PUBLICATIONS

ISA/US, International Search Report and Written Opinion of the International Searching Authority, PCT/US18/58509, Jan. 18, 2019.

*Primary Examiner* — Jessica L Laux
(74) *Attorney, Agent, or Firm* — FRESH IP PLC

(57) ABSTRACT

A hydraulic expandable connector for taking up a slack in a tie rod in a hold-down system includes an inner cylindrical body disposed within an outer cylindrical body; a first actuation spring operably attached to the inner cylindrical body and the outer cylindrical body to urge relative motion between the inner cylindrical body and the outer cylindrical body such that the connector expands axially to take up the slack; a first chamber and a second chamber disposed between an outer wall surface of the inner cylindrical body and an inner wall surface of the outer cylindrical body; a first passageway communicating between the first chamber and the second chamber; and a valve operably disposed in the first passageway in an open position when the connector expands and a closed position when the connector is subjected to an axial load.

23 Claims, 37 Drawing Sheets

(56) References Cited

U.S. PATENT DOCUMENTS

| | | | | |
|---|---|---|---|---|
| 4,523,742 | A | * | 6/1985 | Reneau .................. F16B 21/16 |
| | | | | 81/57.38 |
| 4,535,656 | A | | 8/1985 | Orban |
| 4,569,258 | A | | 2/1986 | Orban |
| 4,569,506 | A | | 2/1986 | Vassalotti |
| 4,844,418 | A | | 7/1989 | Cole |
| 4,875,314 | A | * | 10/1989 | Boilen ..................... E04H 9/14 |
| | | | | 52/236.7 |
| 5,871,205 | A | * | 2/1999 | Latham .................. B25B 29/02 |
| | | | | 254/29 A |
| 5,878,490 | A | | 3/1999 | Heinold |
| 6,951,078 | B2 | * | 10/2005 | Espinosa ................ F16B 37/00 |
| | | | | 411/517 |
| 8,186,924 | B1 | | 5/2012 | Espinosa |
| 9,188,146 | B1 | * | 11/2015 | Trautman ............... F16B 31/04 |
| 10,041,594 | B2 | | 8/2018 | Patterson |
| 11,285,573 | B2 | | 3/2022 | Greenwell |
| 2002/0159823 | A1 | | 10/2002 | Aday |
| 2005/0055897 | A1 | * | 3/2005 | Commins ................ E04H 9/14 |
| | | | | 52/169.1 |
| 2008/0060297 | A1 | * | 3/2008 | Espinosa ................ E02D 27/34 |
| | | | | 411/533 |
| 2018/0135676 | A1 | * | 5/2018 | Taneichi ............ F16B 37/0857 |

* cited by examiner

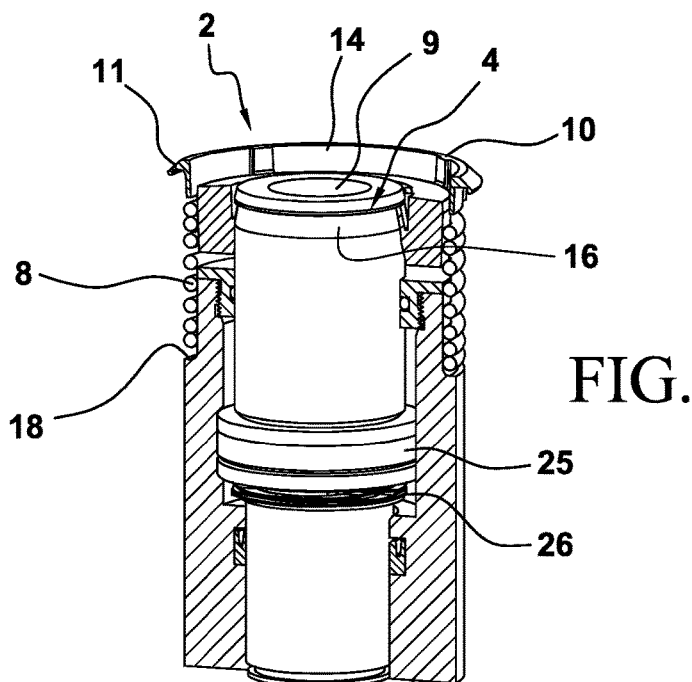
FIG. 1
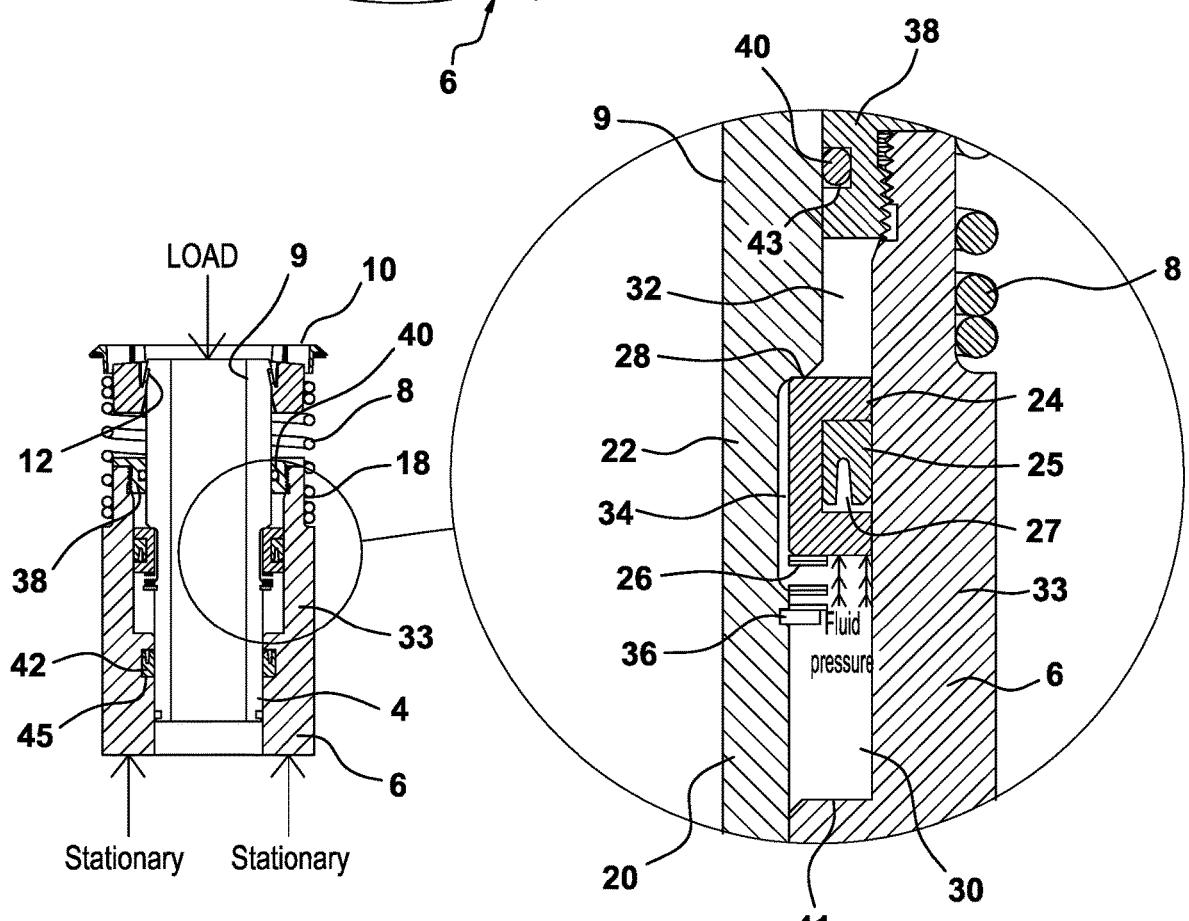
FIG. 2A
FIG. 2B

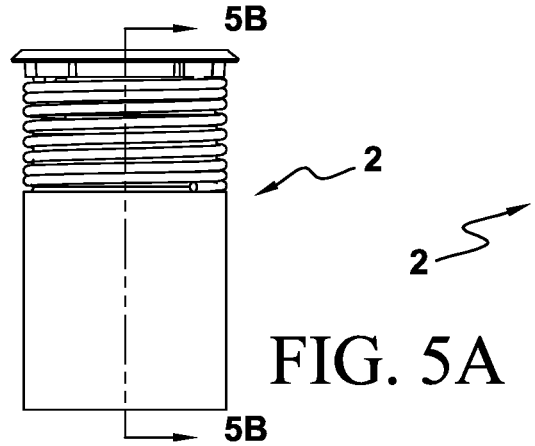 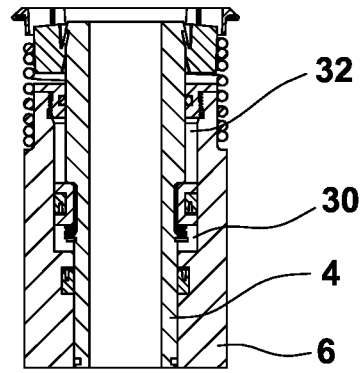
FIG. 5A  FIG. 5B
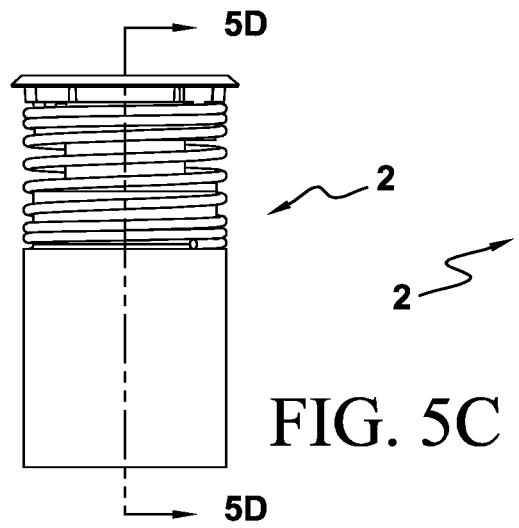 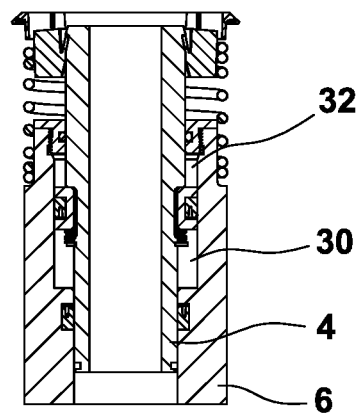
FIG. 5C  FIG. 5D
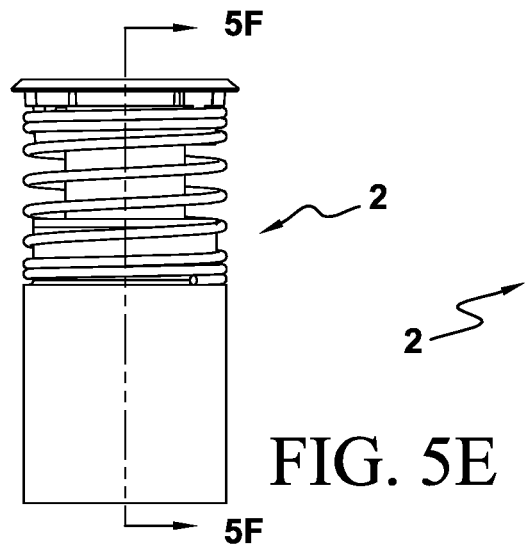 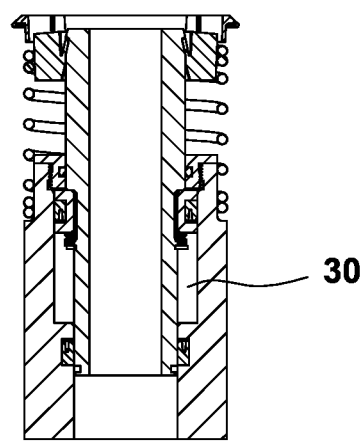
FIG. 5E  FIG. 5F

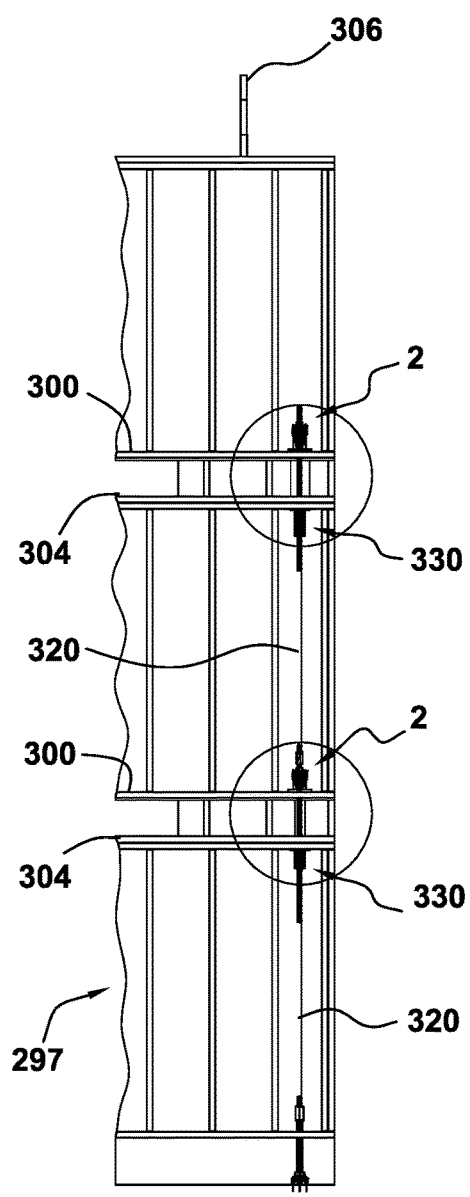
FIG. 35
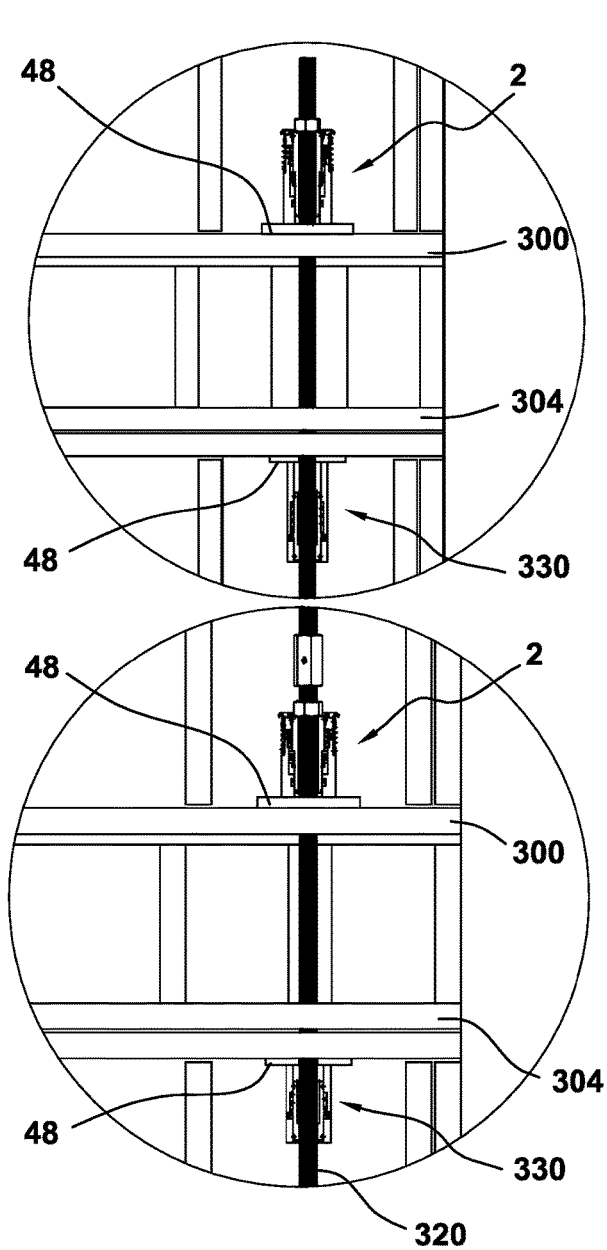
FIG. 36
FIG. 37

HYDRAULIC EXPANDABLE CONNECTOR

RELATED APPLICATION

This is a divisional application of Nonprovisional application Ser. No. 17/359,877, filed Jun. 28, 2021, which is a divisional application of Nonprovisional Application Ser. No. 16,176,869, filed Oct. 31, 2018, claiming the priority of Provisional Application Ser. No. 62/580,065, filed Nov. 1, 2017, all of which are hereby incorporated by reference.

FIELD OF THE INVENTION

The present invention is generally directed to a tension hold-down system used in walls in light frame construction to resist uplift and to compensate for wood shrinkage in wood frame construction and compression loading.

SUMMARY OF THE INVENTION

The present invention provides a hydraulic expandable connector for taking up a slack in a tie rod in a hold-down system, comprising an inner cylindrical body disposed within an outer cylindrical body; a first actuation spring operably attached to the inner cylindrical body and the outer cylindrical body to urge relative motion between the inner cylindrical body and the outer cylindrical body such that the connector expands axially to take up the slack; a first chamber and a second chamber disposed between an outer wall surface of the inner cylindrical body and an inner wall surface of the outer cylindrical body; a first passageway communicating between the first chamber and the second chamber; and a valve operably disposed in the first passageway, the valve having a closed position and an open position, the valve is in the open position when the connector expands to allow fluid from the first chamber to flow to the second chamber, the valve is in the closed position when the connector is subjected to an axial load to pressurize the fluid in the second chamber and absorb the load.

The present invention further provides a hydraulic expandable connector for taking up a slack in a tie rod in a hold-down system, comprising an inner cylindrical body disposed within an outer cylindrical body; a first piston slidable between the inner cylindrical body and the outer cylindrical body; a first spring operably attached to the outer cylindrical body to push the first piston axially; a first chamber and a second chamber disposed between an outer wall surface of the inner cylindrical body and an inner wall surface of the outer cylindrical body; a first passageway communicating between the first chamber and the second chamber; a valve operably disposed in the first passageway, the valve having a closed position and an open position, the valve is in the open position when the connector expands to allow fluid from the first chamber to flow to the second chamber, the valve is in the closed position when the connector is subjected to an axial load; and the first spring pressurizes the fluid in the first chamber to cause the fluid to flow into the second chamber through the passageway and axially move the inner cylindrical body away to expand the connector.

The present invention still further provides a hydraulic expandable connector for taking up a slack in a tie rod hold-down system, comprising an inner cylindrical body disposed within an outer cylindrical body; a first piston slidable between the inner cylindrical body and the outer cylindrical body; a first spring operably attached to the outer cylindrical body to push the first piston axially; a first chamber and a second chamber disposed between an outer wall surface of the inner cylindrical body and an inner wall surface of the outer cylindrical body; a first passageway communicating with the first chamber and the second chamber; a valve operably disposed in the first passageway, the valve having a closed position and an open position, the valve is in the open position when the connector expands to allow fluid from the first chamber to flow to the second chamber, the valve is in the closed position when the connector is subjected to an axial load; and the first spring pressurizes the fluid in the first chamber to cause the fluid to flow into the second chamber through the passageway.

The present invention provides a hydraulic expandable connector for taking up a slack in a tie rod in a hold-down system, comprising an inner cylindrical body disposed within an outer cylindrical body; a first spring operably attached to the inner cylindrical body and the outer cylindrical body to urge relative motion between the inner cylindrical body and the outer cylindrical body such that the connector expands axially to take up the slack; a first chamber and a second chamber disposed between an outer wall surface of the inner cylindrical body and an inner wall surface of the outer cylindrical body; a passageway communicating between the first chamber and the second chamber; a valve operably disposed in the passageway, the valve having a closed position and an open position, the valve is in the open position when the connector expands to allow fluid from the first chamber to flow to the second chamber, the valve is in the closed position when the connector is subjected to an axial load; and the valve including a deformable wall portion that deforms into an inner wall of the outer cylindrical body when the connector is subjected to an axial load to lock the inner cylindrical body with the outer cylindrical body.

The present invention still further provides a reinforced building wall, comprising a reinforced building wall, comprising a horizontal wall framing member; a bearing plate supported by the wall framing member; a tie rod operably attached to a foundation of the wall and extending through the bearing plate; a hydraulic expandable connector for taking up a slack in the tie rod, the connector being disposed on the bearing plate, the tie rod extending through the connector; and the hydraulic expandable connector including an inner cylindrical body disposed within an outer cylindrical body, the inner cylindrical body is operably attached to the tie rod, the outer cylindrical body is operably attached to the wall framing member, a first chamber and a second chamber disposed between an outer wall surface of the inner cylindrical body and an inner wall surface of the outer cylindrical body, a passageway communicating between the first chamber and the second chamber, a valve operably disposed in the passageway, the valve having a closed position and an open position, the valve is in the open position when the connector expands to allow fluid from the first chamber to flow to the second chamber, the valve is in the closed position when the connector is subjected to an axial load to pressurize the fluid in the second chamber and absorb the load.

The present invention provides a reinforced building wall, comprising a horizontal wall framing member; a first bearing plate supported by the wall framing member and a second bearing plate disposed vertically spaced above the first bearing plate; a tie rod operably attached to a foundation of the wall and extending through the first and second bearing plates, the tie-rod dividing the first and second bearing plates into a first lateral section on one side of the tie-rod and a second lateral section on a diametrically opposite side of the tie-rod; first and second hydraulic expandable connectors disposed between the first and second bearing plates, the first hydraulic expandable connector being disposed in the first lateral section, the second hydraulic expandable connector being disposed in the second lateral section; each of the hydraulic expandable connectors including an inner cylindrical body disposed within an outer cylindrical body, the inner cylindrical body is operably attached to the tie rod, the outer cylindrical body is operably attached to the wall framing member, a first chamber and a second chamber disposed between an outer wall surface of the inner cylindrical body and an inner wall surface of the outer cylindrical body, a passageway communicating between the first chamber and the second chamber, a valve operably disposed in the passageway, the valve having a closed position and an open position, the valve is in the open position when the connector expands to allow fluid from the first chamber to flow to the second chamber, the valve is in the closed position when the connector is subjected to an axial load to pressurize the fluid in the second chamber and absorb the load; and the tie rod is operably attached to the second bearing plate.

The present invention further provides a reinforced building wall, comprising a horizontal wall framing member; a bearing plate supported by the wall framing member; a tie rod operably attached to a foundation of the wall and extending through the bearing plate; a first hydraulic expandable connector for taking up a slack in the tie rod, the first hydraulic expandable connector being disposed on the bearing plate, the tie rod extending through the first hydraulic expandable connector; a second hydraulic expandable connector for taking up a slack in the tie rod, the second hydraulic expandable connector being disposed above the first hydraulic expandable connector, the tie rod extending through the second hydraulic expandable connector, the tie rod being operably connected to the second hydraulic expandable connector; the first hydraulic connector including first inner cylindrical body disposed within a first outer cylindrical body, a first chamber and a second chamber disposed between an outer wall surface of the first inner cylindrical body and an inner wall surface of the first outer cylindrical body, a first passageway communicating between the first chamber and the second chamber, a first valve operably disposed in the first passageway, the first valve having a closed position and an open position, the first valve is in the open position when the first hydraulic connector expands to allow fluid from the first chamber to flow to the second chamber, the first valve is in the closed position when the connector is subjected to an axial load; the second hydraulic expandable connector including a second inner cylindrical body disposed within a second outer cylindrical body, a first spring operably attached to the second inner cylindrical body and the second outer cylindrical body to urge relative motion between the second inner cylindrical body and the second outer cylindrical body such that the second hydraulic expandable connector expands axially, a third chamber and a fourth chamber disposed between an outer wall surface of the second inner cylindrical body and an inner wall surface of the second outer cylindrical body, a second passageway communicating between the third chamber and the fourth chamber, a second valve operably disposed in the second passageway, the second valve having a closed position and an open position, the second valve is in the open position when the second hydraulic expandable connector expands to allow fluid from the third chamber to flow to the fourth chamber, the second valve is in the closed position when the second hydraulic expandable connector is subjected to an axial load; the tie rod is threaded to the second inner cylindrical body, the first inner cylindrical body is receivable within the second outer cylindrical body to push the second inner cylindrical body upwardly; and a third passageway communicating with the third chamber and the fourth chamber, the third passageway is open all the time to allow fluid to flow between the third chamber and the fourth chamber even when the second passageway is closed.

The present invention further provides a reinforced building wall, comprising a wall including a first section, the first section including a horizontal framing member; a first bearing plate disposed below and engaging the wall framing member; a tie rod operably attached to a foundation of the wall and extending through the bearing plate, the tie rod is operably attached to the wall above the framing member; a first hydraulic expandable connector for taking up a slack in the tie rod, the first hydraulic expandable connector being disposed below and engaging the bearing plate, the tie rod extending through the first hydraulic expandable connector; the hydraulic expandable connector including a first inner cylindrical body disposed within a first outer cylindrical body, a first chamber and a second chamber disposed between an outer wall surface of the first inner cylindrical body and an inner wall surface of the first outer cylindrical body, a piston portion attached to the first inner cylindrical body, the piston portion separating the first chamber from the second chamber, a first passageway through the piston portion communicating between the first chamber and the second chamber, the first passageway allowing fluid from the first chamber to flow to the second chamber when the hydraulic expandable connector is subjected to an axial load to pressurize the fluid in the second chamber and absorb the load; and the tie rod is threaded to the inner cylindrical body. The present invention still further provides a coupling for attaching one end of a rod to another end of another rod, comprising a housing including a chamber inside the housing, the housing including first and second opposite end portions; a piston inside the chamber, the piston being slidable between the first and second end portions of the housing, the piston including a rod portion extending outside the housing through the first end portion for attachment to a tie rod; the piston dividing the chamber into a first chamber on one side of the piston and a second chamber on another side of the piston, the piston including an opening communicating with the first chamber and the second chamber to allow fluid to flow from the first chamber to the second chamber; and the second end portion of the housing for attachment to another tie rod.

BRIEF DESCRIPTION OF THE DRAWINGS

FIG. 1 is a perspective view, shown partly in cross-section, of a hold-down device, embodying the present invention.

FIG. 2A is a side elevational view of FIG. 1, in cross-section.

FIG. 2B is an enlarged view of a portion of the hold-down device shown in FIG. 2A.

FIGS. 5A-5F are side elevational and cross-sectional views of the hold-down device shown in FIG. 1, depicting an initial set position (FIGS. 5A and 5B), a middle travel position (FIGS. 5C and 5D) and a fully expanded position (FIGS. 5E and 5F).

FIG. 20 FIG. 19 is cross-sectional view of a hold-down device, embodying the present invention.

FIG. 35 is cross-sectional view of a three-level building wall incorporating multiple hold-down devices shown in FIG. 1.

FIGS. 36-37 are enlarged views in cross-section of portions taken from FIG. 35.

DETAILED DESCRIPTION OF THE INVENTION

Figure 3:
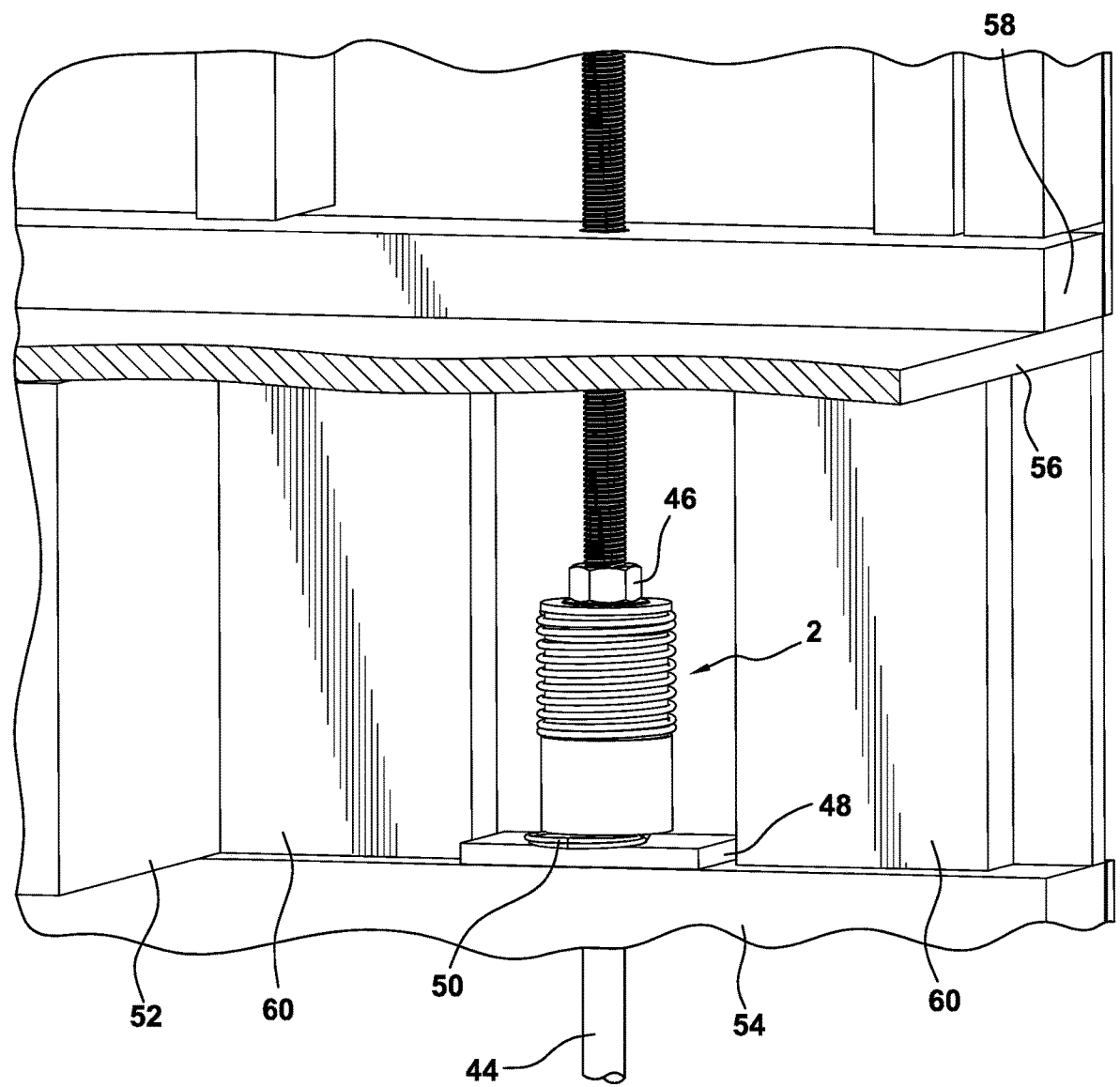
FIG. 3 is a perspective view of a wall structure incorporating the device shown in FIG. 1.

Referring to FIGS. 1, 2A and 2B, a hydraulic expandable connector 2 embodying the present invention is disclosed. The connector 2 includes an inner cylindrical body 4 disposed within an outer cylindrical body 6. The inner cylindrical body 4 is slidable relative to the outer cylindrical body 6 during operation. An actuation spring 8 is operably attached to the inner cylindrical body 4 and the outer cylindrical body 6 to cause relative motion of the inner cylindrical body 4 with the outer cylindrical body 6 during use. The inner cylindrical body 4 has a central opening 9 through which a tie rod is extended in a typical installation.

A retainer ring 10 is removably attached to an upper portion of the inner cylindrical body 4 to capture the upper end portion of the spring 8. The retainer ring 10 has a plurality of resilient fingers 12 disposed around the periphery of an opening 14 that are received in a circumferential groove 16, which holds the retainer ring 10 attached to the inner cylindrical body 4. The retainer ring 10 has a circumferential portion 11 that extends outwardly to capture the upper end of the spring 8. The retainer ring 10 is further described in application Ser. No. 15/265,613, filed Sep. 14, 2016, hereby incorporated by reference. The outer cylindrical body 6 has a reduced diameter portion 18 to capture the lower end portion of the spring 8. The spring 8 urges relative sliding movement between the inner cylindrical body 4 and the outer cylindrical body 6.

The inner cylindrical body 4 has a reduced diameter portion 20 and another reduced diameter portion 22 with a smaller diameter than the reduced diameter portion 20. The reduced diameter portions 20 and 22 are axially adjacent to each other. A piston member 24 in the form of a ring or sleeve is disposed within the portion 22. A seal 25 disposed within an annular groove 27 in the piston 24 seals the piston to the outer cylindrical body 6. A spring 26 urges the piston 24 against a seat 28 on the portion 22. Fluid chambers 30 and 32 are disposed on either side of the piston 24. A passageway 34 communicates between the chambers 30 and 32. The passageway 34 is a gap between the piston 24 and the reduced diameter portion 22 of the inner cylindrical body 2. A retainer ring 36 holds the spring 26 in place. An endcap 38 is threaded to the outer cylindrical body 6. A seal 40 within an annular groove 43 in the endcap 38 seals the fluid chamber 32. A seal 42 within an annular groove 45 in the outer cylindrical body 6 seals the fluid chamber 30. The upper chamber 30 is bounded by the bottom of the endcap 38, the portion 33 and top of the piston 24 and inner cylindrical body 4. The lower chamber 32 is bounded by the portion 33, a shoulder 41 extending radially toward the inner cylindrical body 4, the bottom of the piston 24 and the inner cylindrical body 4. The upper chamber 32 and the lower chamber 30 are filled with hydraulic fluid, such as mineral oi, water, etc. The piston member 24 functions as a valve, opening or closing the passageway 34.

Referring to FIG. 3, the connector 2 is attached to a stud wall by means of a tie rod 44 with a nut 46. The tie rod 44 is attached to a wall foundation with an anchor and an anchor rod (see FIG. 28A). A bearing plate 48 may be used to effectively transfer the forces on the connector 2 onto the stud wall. A clip 50 is removed after the connector 2 is installed to release the inner cylindrical body 4 relative to the outer cylindrical body 6 so that the spring 8 can move the inner cylindrical body 4 when the stud wall settles downwardly. The connector 2 is shown installed inside a floor system comprising floor joists 52 (one shown) supported on a horizontal framing member, such as a top plate 54 of the stud wall below. A sub-floor 56, supported by the floor joist 52, supports a bottom plate 58 of the stud wall above. Support blockings 60 provides additional rigidity to the space adjacent the connector 2.

The connector 2 shown in FIG. 3 may also be replaced by the connector 64 shown in FIG. 6A-7B.

Figures 4A, 4B:
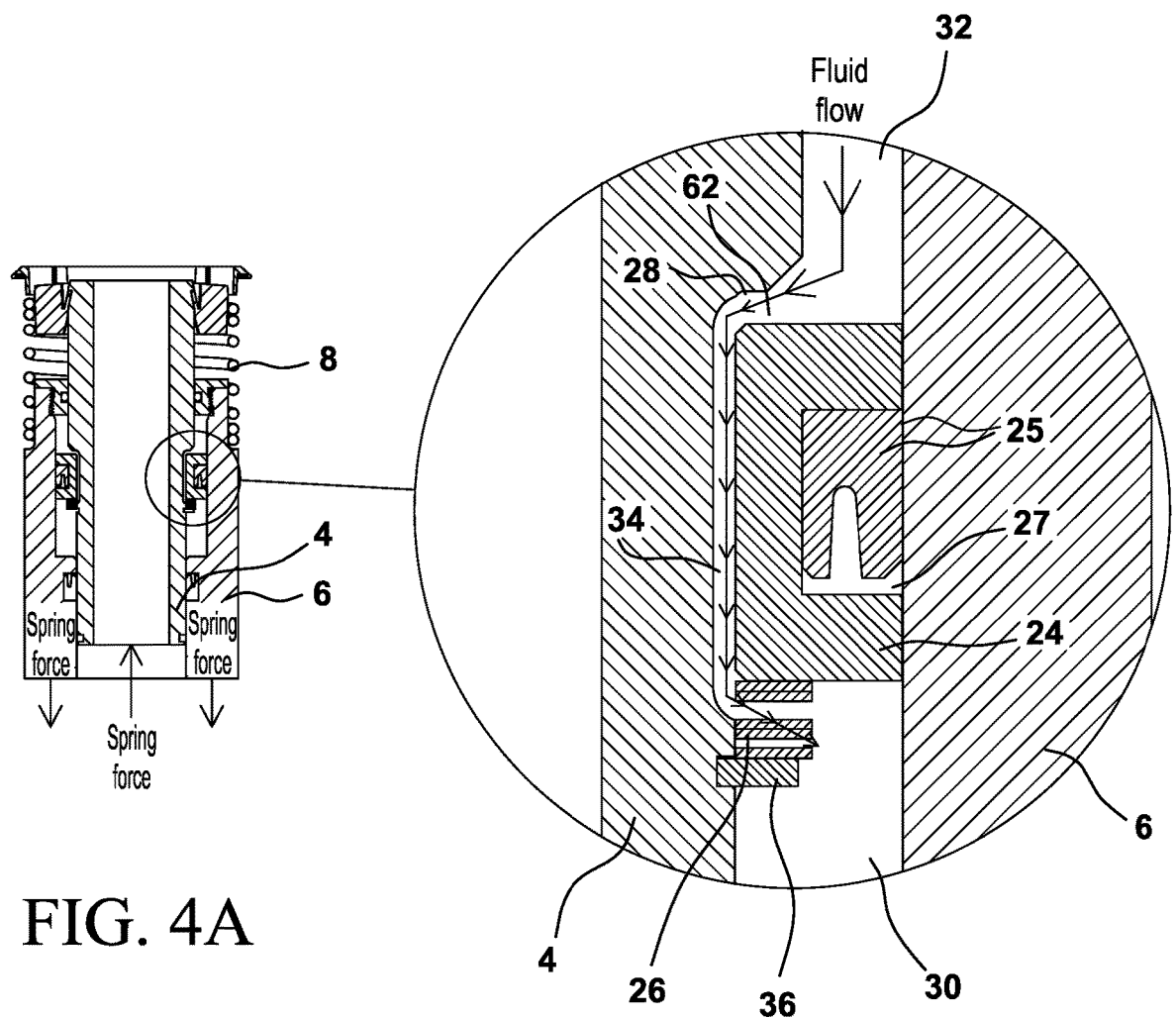
FIG. 4A is a side elevational view of FIG. 2A, showing the hold-down device in operation.
FIG. 4B is an enlarged view of a portion of the hold-down device shown in FIG. 4A.

Referring to FIGS. 4A and 4B, when the inner cylindrical body 4 moves upwardly from the action of the spring 8 due to the settlement of the stud wall, the piston 24 also moves but lags behind due to the pressurization of the fluid in the upper chamber 32. The spring 26 is compressed by the higher pressure of the fluid in the upper chamber 32, creating a gap 62 that communicates with the passageway 34. The gap 62 serves as an entrance to the passageway 34. Fluid from the chamber 32 flows to the lower chamber 30. The upward movement of the inner cylindrical body 4 increases the volume of the lower chamber 30, creating a lower pressure that causes the pressurized fluid from the upper chamber 32 to flow through the gap 62. After the inner cylindrical body 4 has come to a rest, the spring 26 will push the piston 24 toward the seat 28 to close the gap 62.

When an axial downward load is applied to the inner cylindrical body 4 when the stud wall tries to lift up during a windstorm, hurricane, earthquake, etc., the downward load is resisted by the piston 24 pressing on the fluid in the lower chamber 30 to a higher pressure than in the upper chamber 32. Since the fluid, such as oil, is incompressible, and the passageway 34 is closed at the gap 62 by the piston 24 contacting the seat 28, the connector 2 is able to hold the wall down. The piston 24 acts as a valve, opening or closing the passageway 34 at the gap 62 as the connector 2 reacts to a load. Referring to FIGS. 5A-5B, the connector 2 is shown in an initial set position, prior to expanding to take up a slack in the tie rod 44. The upper chamber 32 and the lower chamber 30 are shown in their initial volumes.

Referring to FIGS. 5C-5C, the connector has expanded to take the slack in the tie rod 44. The inner cylindrical body 4 has moved upwardly, decreasing the volume of the upper chamber 32 while increasing the volume of the lower chamber 30. The expansion of the connector 2 compresses the fluid in the upper chamber 32, causing the fluid to flow through the gap 62 and the passageway 34 into the lower chamber 30.

Referring to FIGS. 5E-5F, the connector 2 has expanded to its fully expanded position. The volume of the upper chamber 32 is reduced to zero, with the top end of the piston 24 butting against the bottom end of the endcap 38. The volume of the lower chamber 30 is at maximum.

The actuation spring 8 may be made so that when compressed, it will have enough stored energy to cause upward movement of the inner cylindrical body 4 when a slack develops in the tie rod 44. The actuation spring 8 may also be made so that in addition to the energy to expand the connector 2 when a slack develops in the tie rod 44, the spring 8 will have sufficient stored energy to tension the tie rod 44 extending below the connector 2.

Figures 6A, 6B:
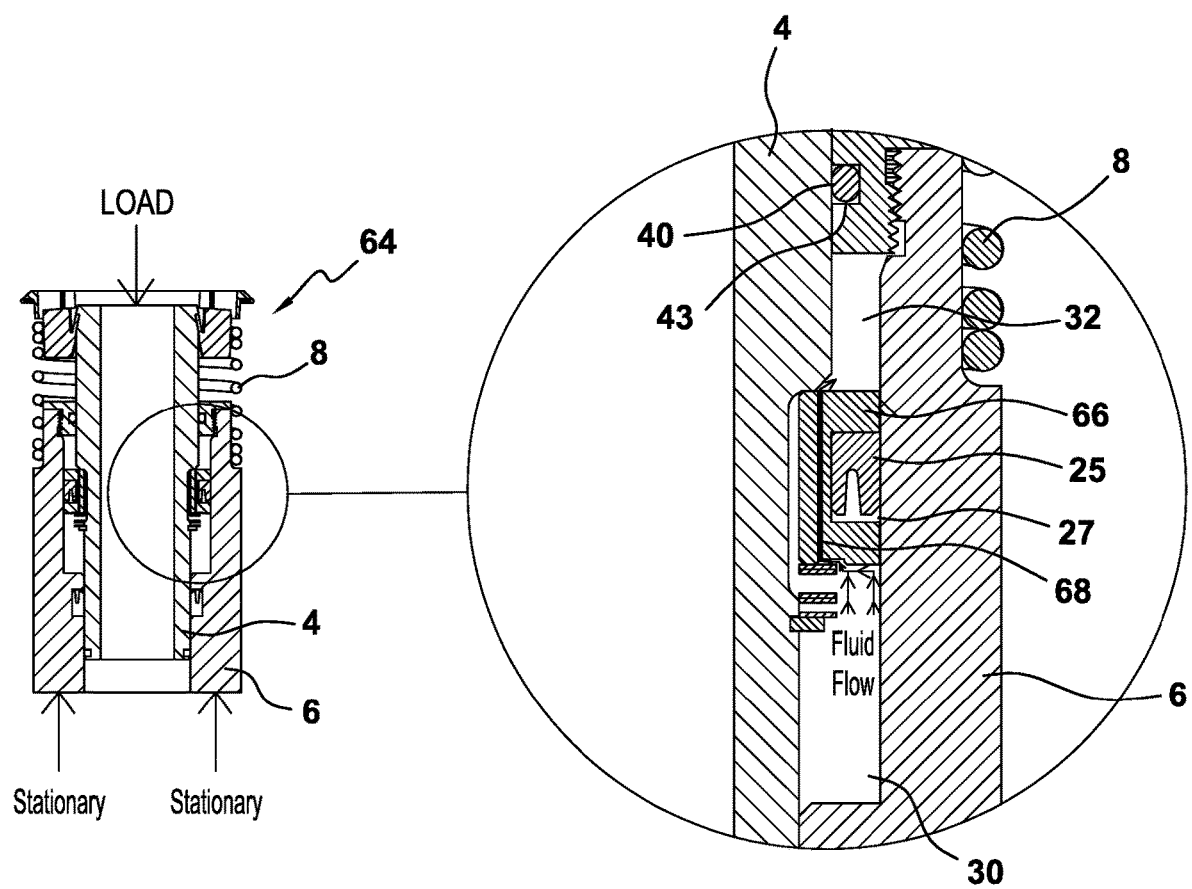
FIG. 6A is a side elevational view, shown in cross-section of another embodiment of a hold-down device, embodying the present invention.
FIG. 6B is an enlarged view of a portion of the hold-down device shown in FIG. 6A.

Referring to FIGS. 6A and 6B, another embodiment of a hydraulic expandable connector 64 is disclosed. The connector 64 is the same as the connector 2, except the piston 24 is modified as piston 66. The piston 66 includes a plurality of passageways 68 in the form of holes arranged around the piston 66 that communicate with the upper chamber 32 and the lower chamber 30. When a downward load is imposed on the inner cylindrical body 4, fluid from the lower chamber 30 flows through the passageways 68, allowing the piston 66 to move downwardly in a controlled manner, creating a dampening effect.

Figures 7A, 7B:
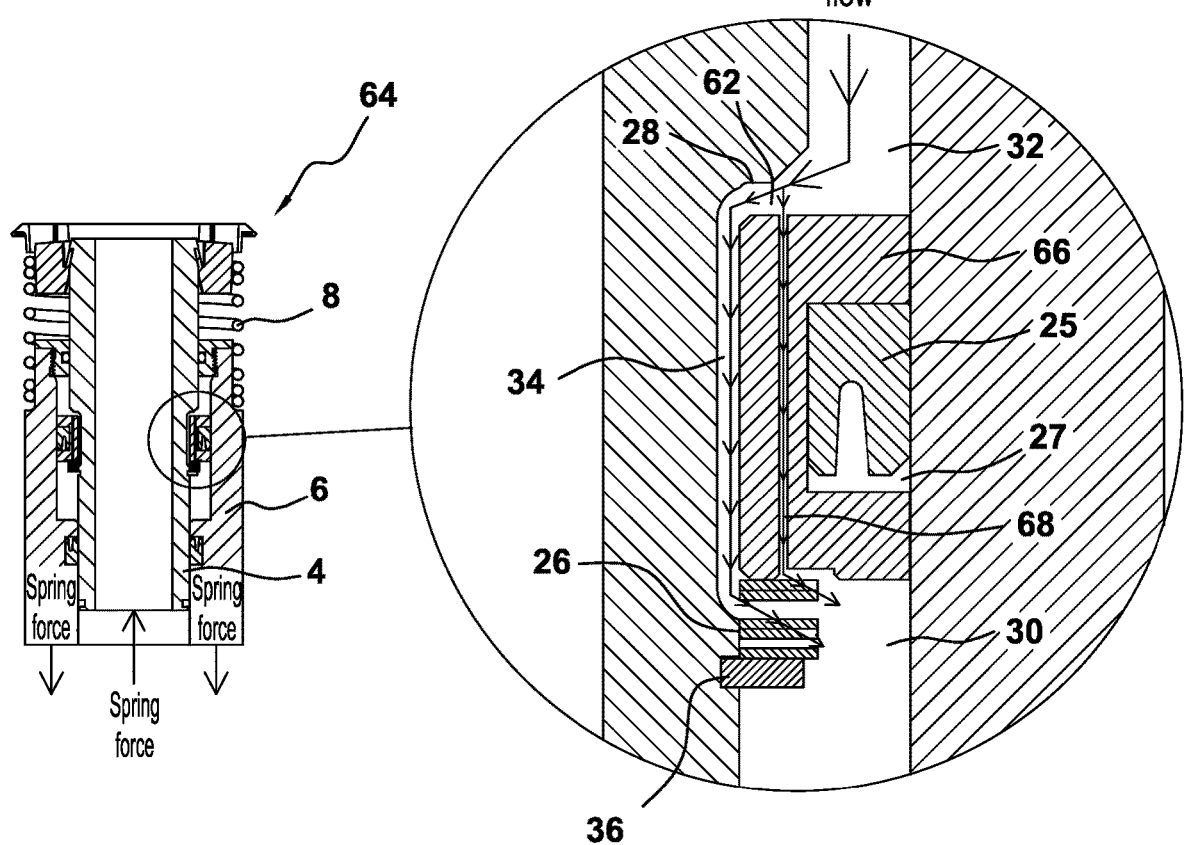
FIG. 7A is a side elevation view, shown in cross-section, of the hold-down device shown in FIG. 6A, showing the device in operation.
FIG. 7B is an enlarged view of a portion of the hold-down device shown in FIG. 7A.

Referring to FIGS. 7A and 7B, as the connector 64 expands to take up a slack that develops in the tie rod 44, the inner cylindrical body 4 moves upwardly under the action of the actuation spring 8. The piston actuation spring 26 is compressed by the piston 66, causing the top end of the piston 66 to separate from the seat 28 to create the gap 62 that communicates with the passageway 34. The upper chamber 32 decreases in volume, pressurizing the fluid in the chamber while the lower chamber 30 increases in volume, creating a vacuum that causes the fluid from the upper chamber 32 to flow into the lower chamber 30. Some fluid also flows through the passageways 68. When the entire slack has been taken up, expansion stops and the piston 66 moves to engage the seat 28 under the action of the spring 26. The connector 64 at this position is ready to absorb a downward load when the stud wall tries to lift up during a storm, hurricane, earthquake, etc.

The connectors 2 and 64 are actuated by the spring 8 when the stud wall moves downwardly due to settlement. The spring 8 is disposed outside the connectors 2 and 64.

Figure 8:
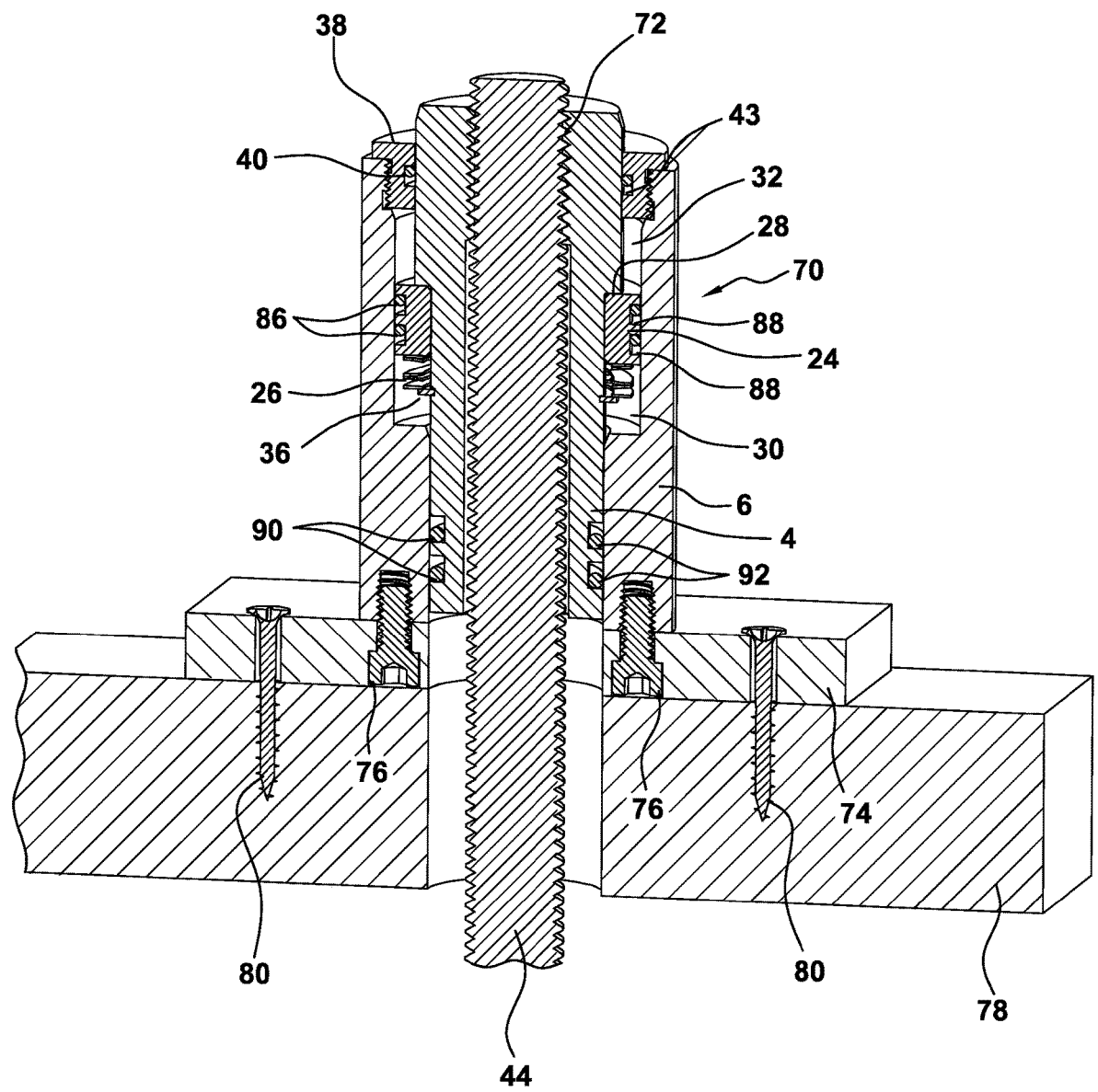
FIG. 8 is a perspective view, shown partly in cross-section, of another embodiment of a hold-down device, embodying the present invention, using the displacement of the wall to which it is attached to actuate the device.

Referring to FIG. 8, an embodiment of a hydraulic expandable connector 70 is disclosed that uses the building wall displacement for its actuation rather than the spring 8. The connector 70 works the same way as the connector 2, except that the inner cylindrical body 4 is threaded to the tie rod 44 and the outer cylindrical body 6 is attached to the wall structure. The inner cylindrical body 4 includes an inner threaded portion 72 attached to the tie rod 44. The outer cylindrical body 6 is attached to a bearing plate 74 with screws 76. The bearing plate 74 is in turn attached to a horizontal framing member or wall structure 78, such as a bottom plate or a cross-member, with screws 80. Although not shown, the connector the connector 64 without the spring 8 may be modified as shown for the connector 70 for attachment to the building wall structure.

When the wall structure 78 moves downwardly due to settlement, the outer cylindrical member 6 moves with it, while the inner cylindrical body 4 stays stationary with respect to the tie rod 44 but moves upwardly relative to the outer cylindrical body 6. The chamber 30 will expand in volume, creating a lower pressure than in the chamber 32. The piston 24 will separate from the seat 28 to open the passageway 34 (see FIG. 2B) between the chambers 30 and 32. Fluid will flow from the upper chamber 32 into the lower chamber 30 to equalize the pressure between the chambers. The passageway 34 will close when the piston 34, under the action of the spring 26, engages the seat 28. The connector 70 is now ready to resist any downward load on the inner cylindrical body 4. A downward load will be resisted by the fluid in the lower chamber 30 as the fluid is pressurized by the piston 24.

Figure 9:
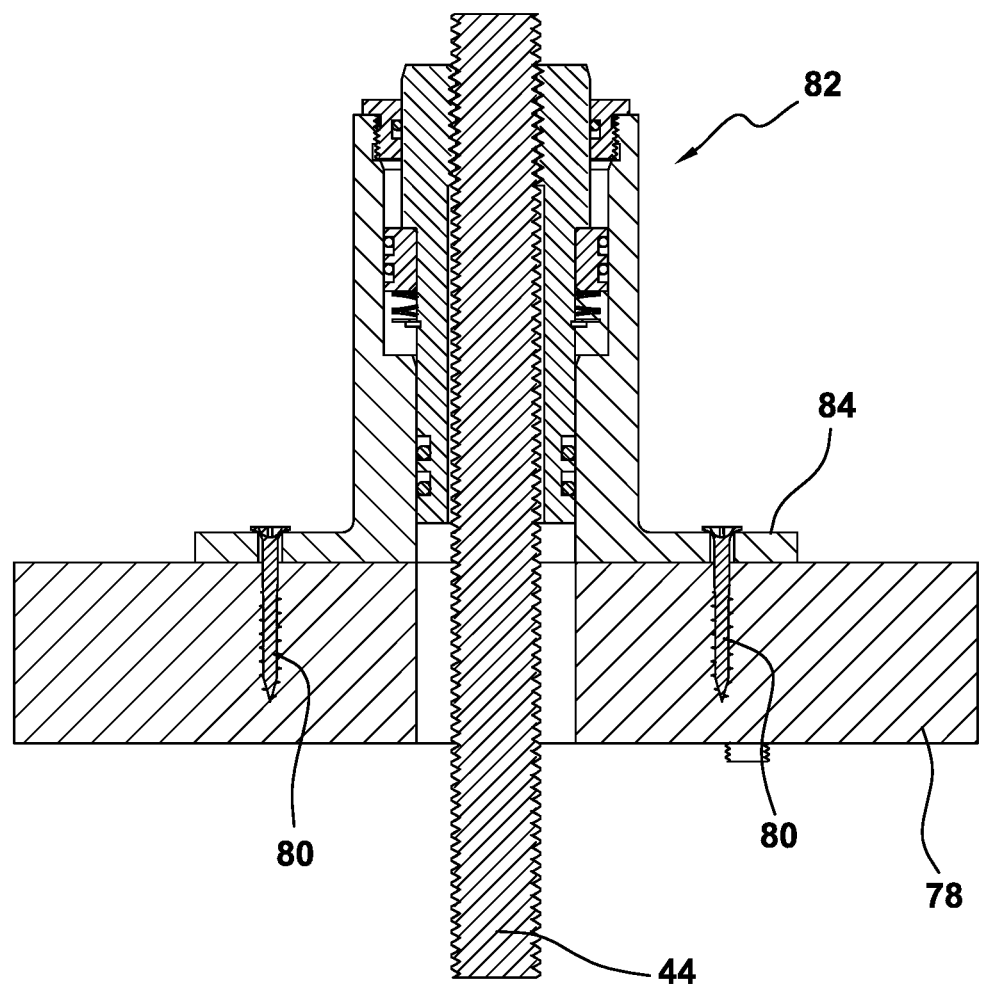
FIG. 9 is a cross-sectional view of another embodiment of a hold-down device, embodying the present invention, showing a bearing plate integrated with the device.

Referring to FIG. 9, an embodiment of a hydraulic expandable connector 82 is disclosed. The connector 80 is the same as the connector 70 and works the same way, except that the bearing plate 74 has been integrated into the outer cylindrical body 6 as a flange 84 attached to the wall structure 78. Although not shown, the connector 64 without the spring 8 may be modified as shown for the connector 82 for attachment to the building wall structure.

Referring back to FIG. 8, the piston 24 is sealed to the outer cylindrical body 6 with a plurality of O-ring seals 86 disposed in respective circumferential grooves 88. Similarly, the inner cylindrical body 4 is sealed to the outer cylindrical body 6 with a plurality of O-ring seals 90 disposed in respective circumferential grooves 92.

Figure 10:
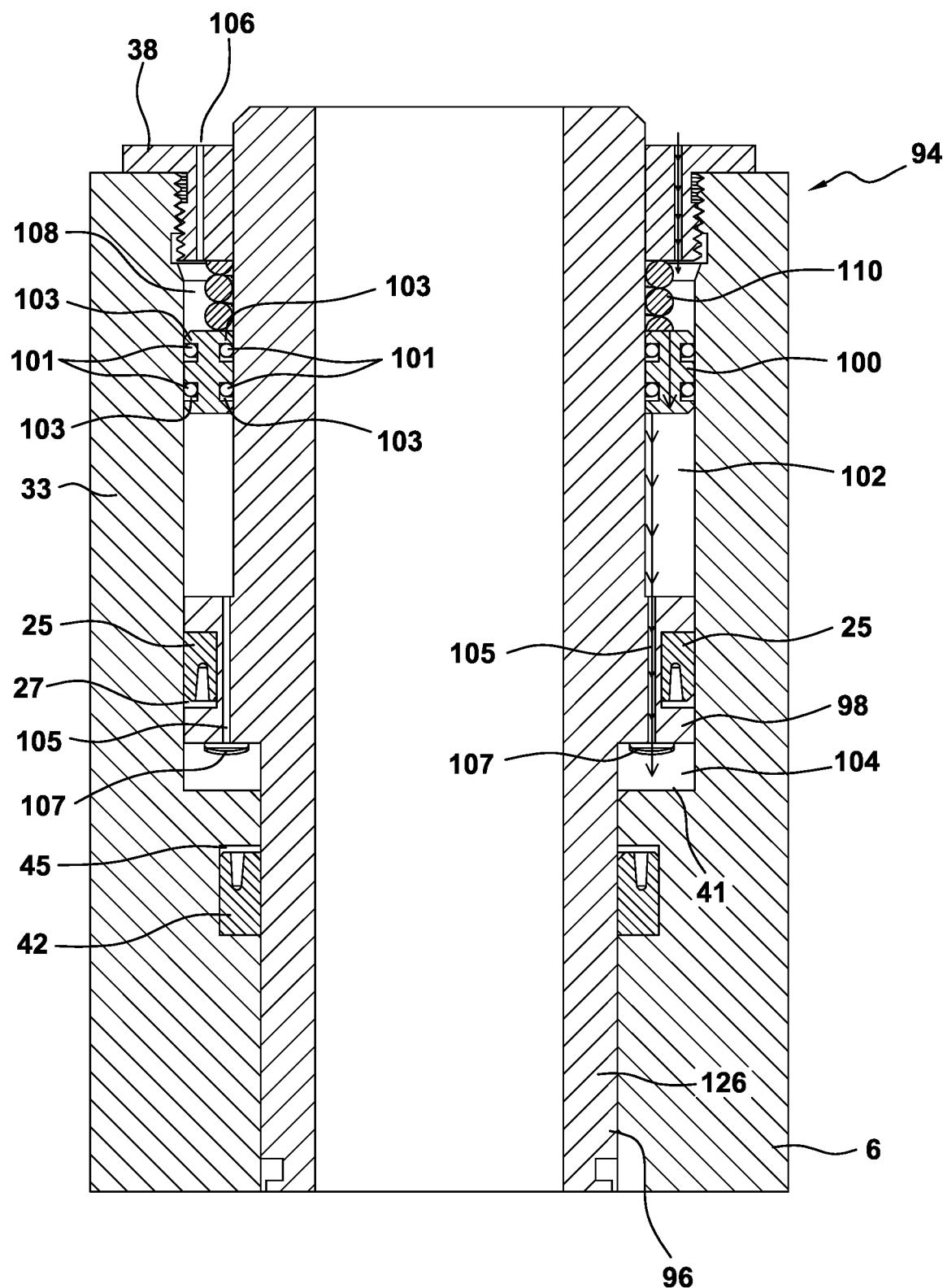
FIG. 10 is a cross-sectional view of another embodiment of a hold-down device, embodying the present invention.

Referring to FIG. 10, another embodiment of a hydraulic expandable connector 94 is disclosed. The connector 94 includes an inner cylindrical body 96 disposed inside the outer cylindrical body 6. The inner cylindrical body 96 has a piston portion 98 extending radially and sealed to the outer cylindrical body 6 with the seal 25. The piston portion 98 is preferably integral with the rest of the inner cylindrical body 96. A piston 100 in the form of a ring is disposed between the inner cylindrical body 96 and the outer cylindrical body 6. Seals 101 in annular grooves 103 in the piston 100 seal the space 108 from the upper chamber 102. An upper chamber 102 is bounded by bottom of the piston 100, the top of the piston portion 102, the inner cylindrical body 4 and the portion 33. A lower chamber 104 is disposed below the piston portion 98 and bounded by the bottom of the piston portion 98, the portion 33, the inner cylindrical body 96 and the shoulder 41. A plurality of openings 105 communicate with the upper chamber 102 and the lower chamber 104. The upper chamber 102 and the lower chamber 104 are filled with hydraulic fluid, such as mineral oi, water, etc. A one-way valve 107 is associated with each of the openings 105 to allow flow of the fluid from the upper chamber 102 to the lower chamber 104 but not in the opposite direction. The endcap 38 includes openings 106 that communicates with the outside and the space 108 to equalize the pressure inside the space 108 when the spring 110 expands to push the piston 100 downwardly when the connector 94 expands in response to the settlement of the building wall in which the connector 94 is installed.

The fluid in the upper chamber 102 is constantly pressurized by the spring 110. When slack develops in the tie rod 44 due to building settlement, the pressure from the upper chamber 102 pushes the fluid into the lower chamber 104 through the openings 105 and the one-way valves 107, pushing the inner cylindrical body 96 upwardly to take up the slack. When a downward load is applied to the inner cylindrical body 96 due to wall uplifting during a storm, earthquake, etc., the fluid in the lower chamber 104 is pressurized, closing the one-way valves 107 to prevent fluid flow into the upper chamber 102. Accordingly, the fluid in the lower chamber 104 stops the inner cylindrical body 96 from moving downwardly from the load.

The principle of operation of the connector 94 may be used for the connector 64, wherein the spring 110 and the air inlet openings 110 are used to actuate the connector.

Figures 11A, 11B:
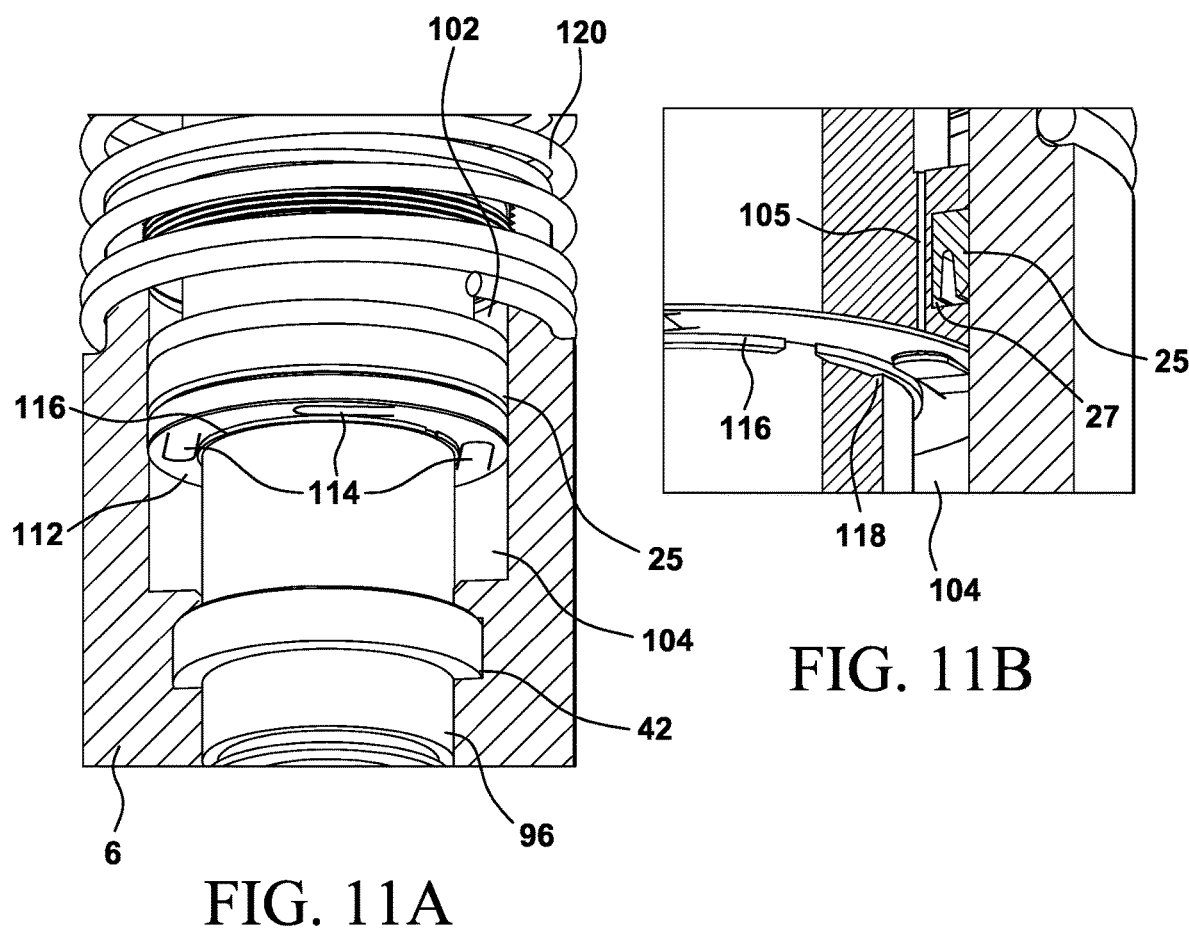
FIGS. 11A-11B are enlarged perspective views, partly shown in cross-section, of portions of the hold-down device shown in FIG. 10, showing an embodiment of the one-way valve shown in FIG. 10.

Referring to FIGS. 11A and 11B, the one-way valve 107 may be made of a ring plate 112 made of a single piece material, such as plastic. Reed portions 114 are cut into the plate 112 on three sides. The reed portions 114 are disposed below the respective openings 105. The reed portions 114 when subjected to fluid pressure from the upper chamber 102 via the openings 105 are configured to separate from the plate 112 along the three cut sides to an open position, as shown in FIG. 11B, to allow the fluid to flow into the lower chamber and close position when the lower chamber 104 is pressurized by a downward load on the inner cylindrical body 96. A retainer ring 116 held in a circumferential groove 118 supports the ring plate 112. A spring 120 is disposed outside the outer cylindrical body 6 in the manner shown for the connectors 2 and 64.

Figure 12:
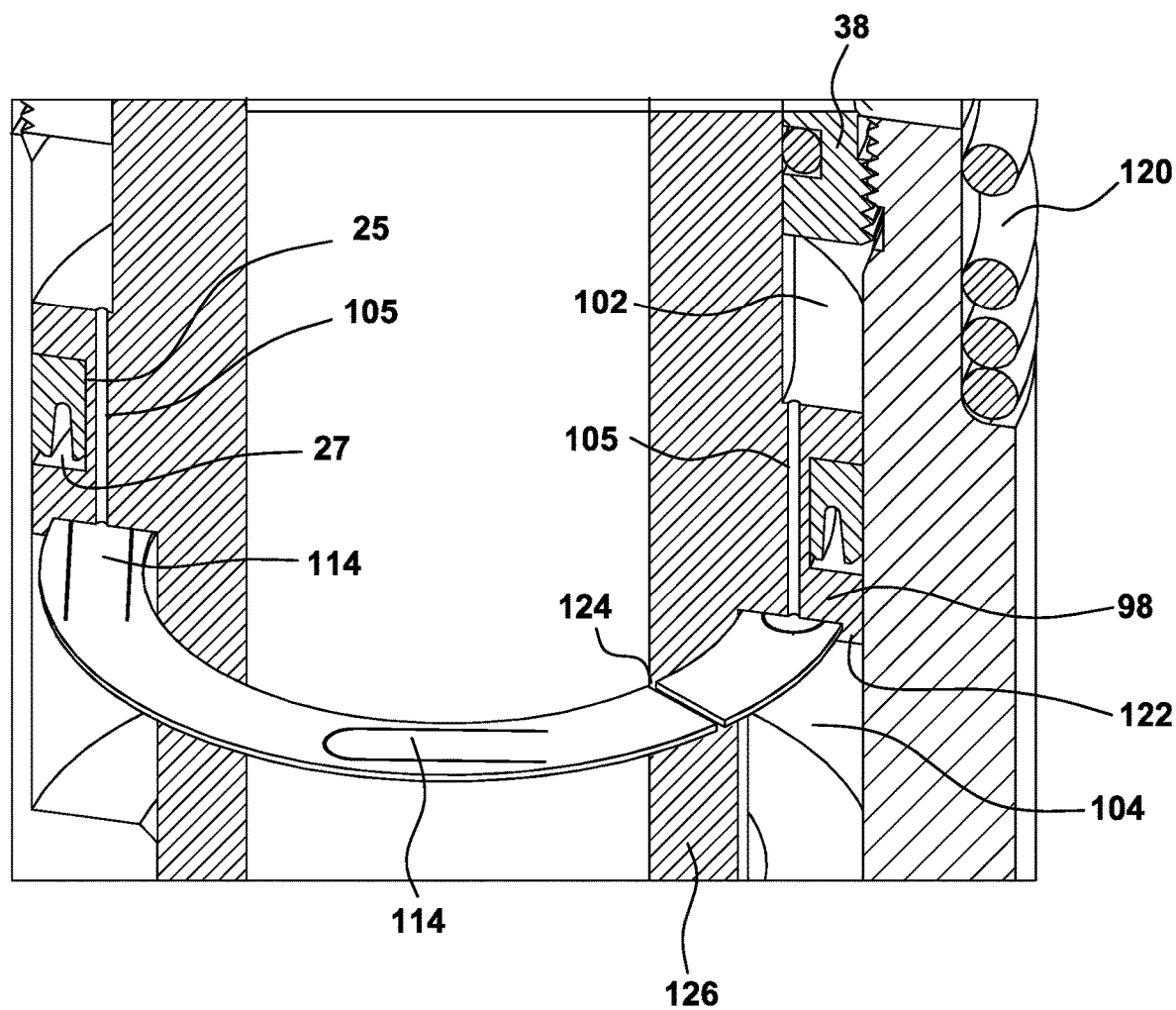
FIG. 12 in an enlarged perspective view, with portions shown in cross-section, of portions of the hold-down device shown in FIG. 10, showing an embodiment of the one-way valve.

Referring to FIG. 12, the plate 112 may be installed into a circumferential groove 122 in the piston portion 98. The plate 112 has a radial cut-out 124 to facilitate insertion of the plate 112 into the groove 122. The plate 112 has an inside diameter larger than the outside diameter of the cylindrical portion 126 to facilitate insertion of the plate 112 into the groove 122. To install the plate 112, the ends at the cut-out 124 are brought together to temporarily reduce the outside diameter of the plate 112 to clear the inside diameter of the outer edge of the groove 122. The ends at the cut-out 124 are released, allowing the plate 112 to spring back to its original size inside the groove 122.

Figure 13:
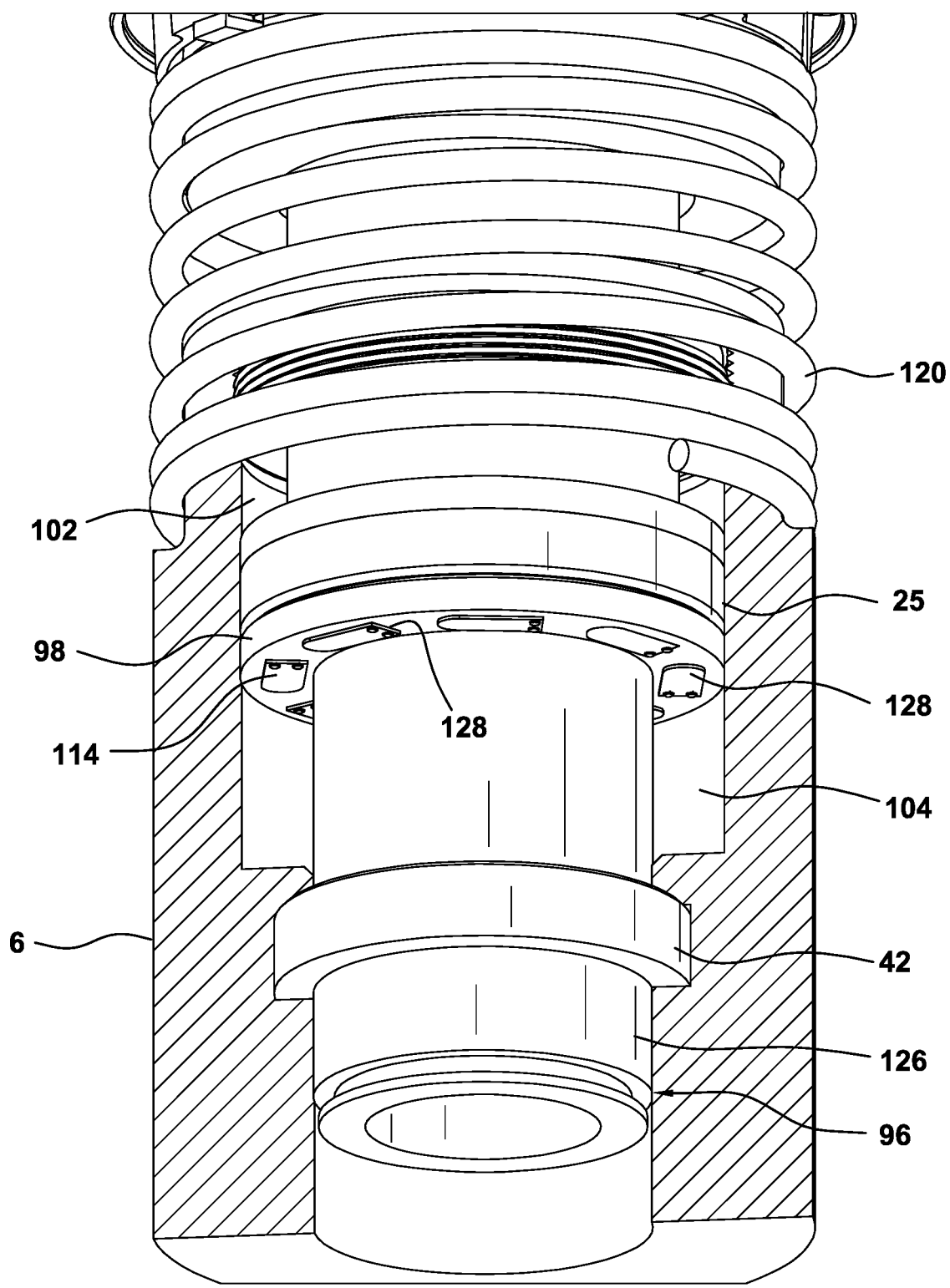
FIG. 13 is an enlarged perspective view, with portions shown in cross-section, of portions of the hold-down device shown in FIG. 10, showing an embodiment of the one-way valve.

Referring to FIG. 13, the reed portions 114 may be attached directly to the underside of the piston portion of the piston portion 98 along one side 128 with standard fastener, such as screws. Each of the reed portions 114 has enough flexibility at the respective side 128 to open or close from the action of the fluid from the upper chamber 102 and the lower chamber 104, respectively. Each of the reed portions 114 is disposed a respective opening 105 (see FIGS. 11B and 12).

Figures 14A, 14B:
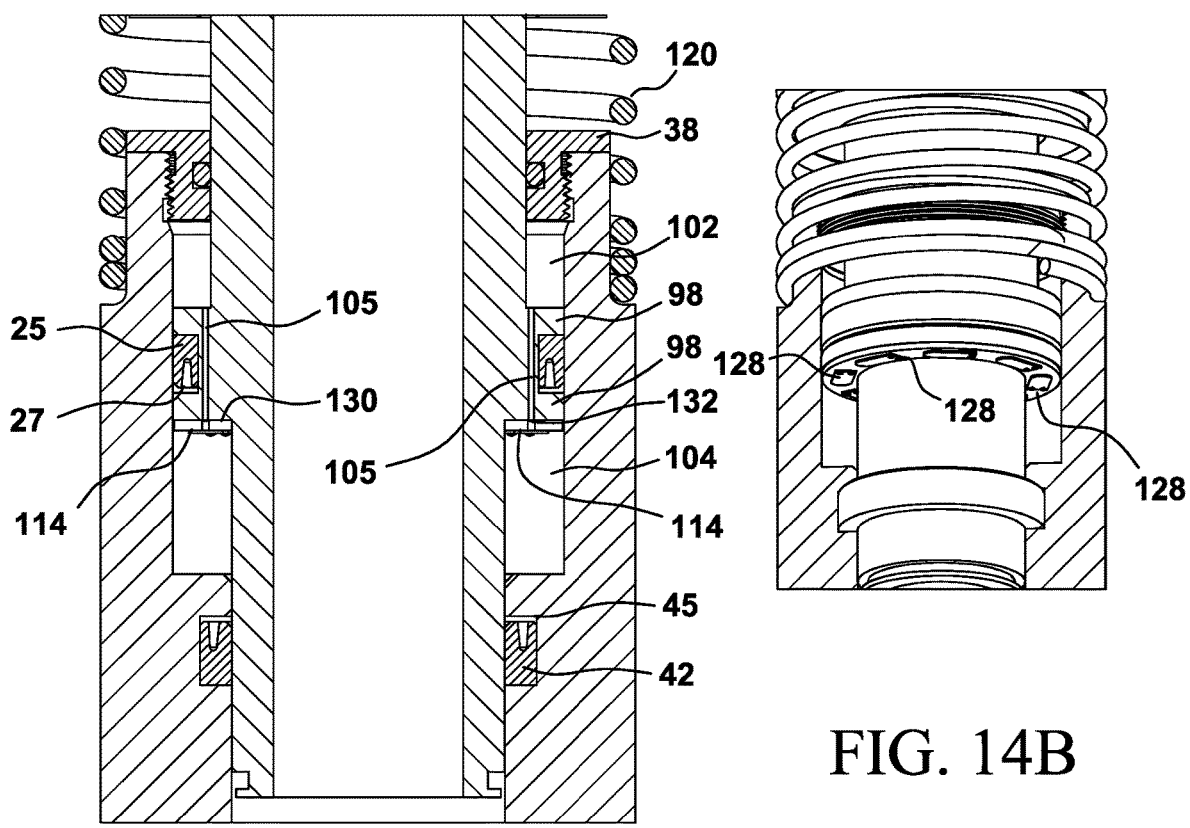
FIGS. 14A-14B are enlarged perspective views, with portions shown in cross-section, of portions of the device shown in FIG. 10, showing an embodiment of attaching the one-way valve.

Referring to FIGS. 14A and 14B, the reed portions 114 may be attached to a ring plate 130. The ring plate 130 has holes 132 aligned with the respective openings 105 in the piston portion 105. Each of the reed portions 114 is attached to the ring plate 130 along the side 128, allowing each of the reed portions 114 to away from or toward the respective openings 132 under the action of the fluid from the upper chamber 102 or the lower chamber 104, respectively. The ring plate 130 is attached to the underside of the piston portion 98 by standard means, such as screws, adhesives, etc.

Figure 15A:
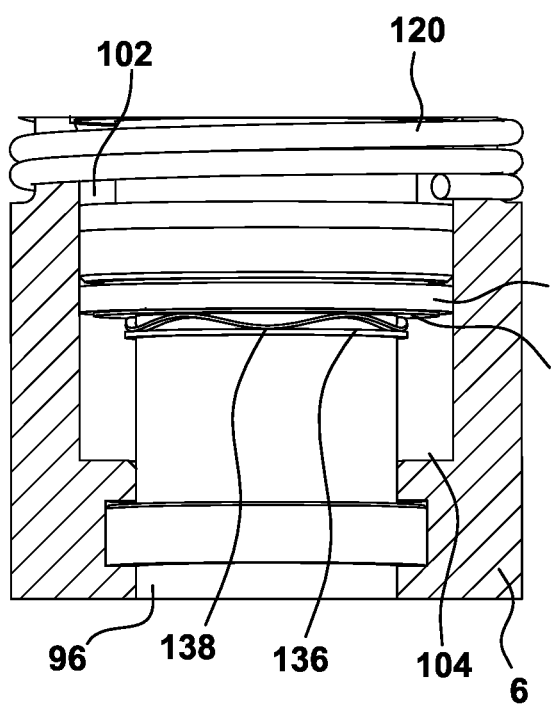
FIGS. 15A-15B are enlarged perspective views, with portions shown in cross-section, of portions of the device shown in FIG. 10, showing an embodiment of the one-way valve.
Figure 15B:
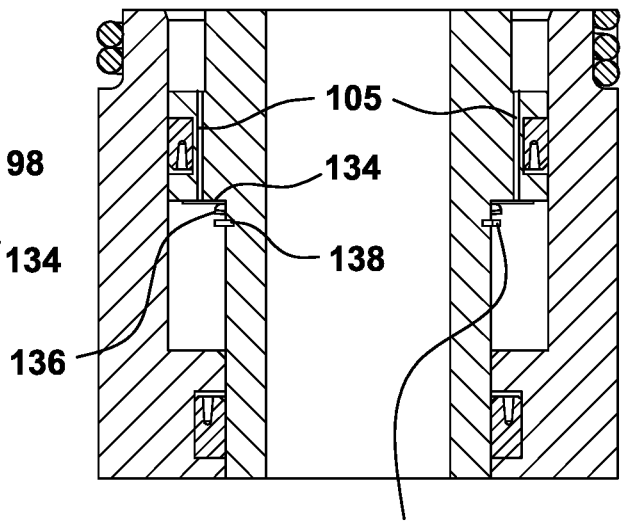

Referring to FIGS. 15A and 15B, the one way valve 107 may be implemented by a flat washer 134 held against the underside of the piston portion 98 by a spring 136 held by a retainer ring 138 in a circumferential groove 140. The flat washer 134 is urged against the underside of the piston portion 98 by the spring 136, closing the openings 105. When the inner cylindrical body 4 moves upwardly to take up the slack in the tie rod 44 due to the building wall's shrinkage, pressure in the upper chamber 102 builds up and pressure in the lower chamber 104 decreases. The pressure changes occur due to the decrease in volume of the upper chamber 102 and increase in volume in the lower chamber 104. Fluid from the upper chamber 102 is then forced through the openings 105, pushing the flat washer 134 away from the underside of the piston portion 98 and compressing the spring 136. Fluid will continue to flow until the pressure in the upper chamber 102 and the lower chamber 104 are equalized. The spring 136 then pushes the flat washer against the piston portion 98, thereby closing the openings 105. When the inner cylindrical body 4 is subjected to a downward load, the fluid in the lower chamber 104 resists the load since the fluid is incompressible. Fluid cannot flow to the upper chamber 102 since the openings 105 are closed by the flat washer 134 being pushed by the pressure in the fluid and the spring 136.

Figure 16:
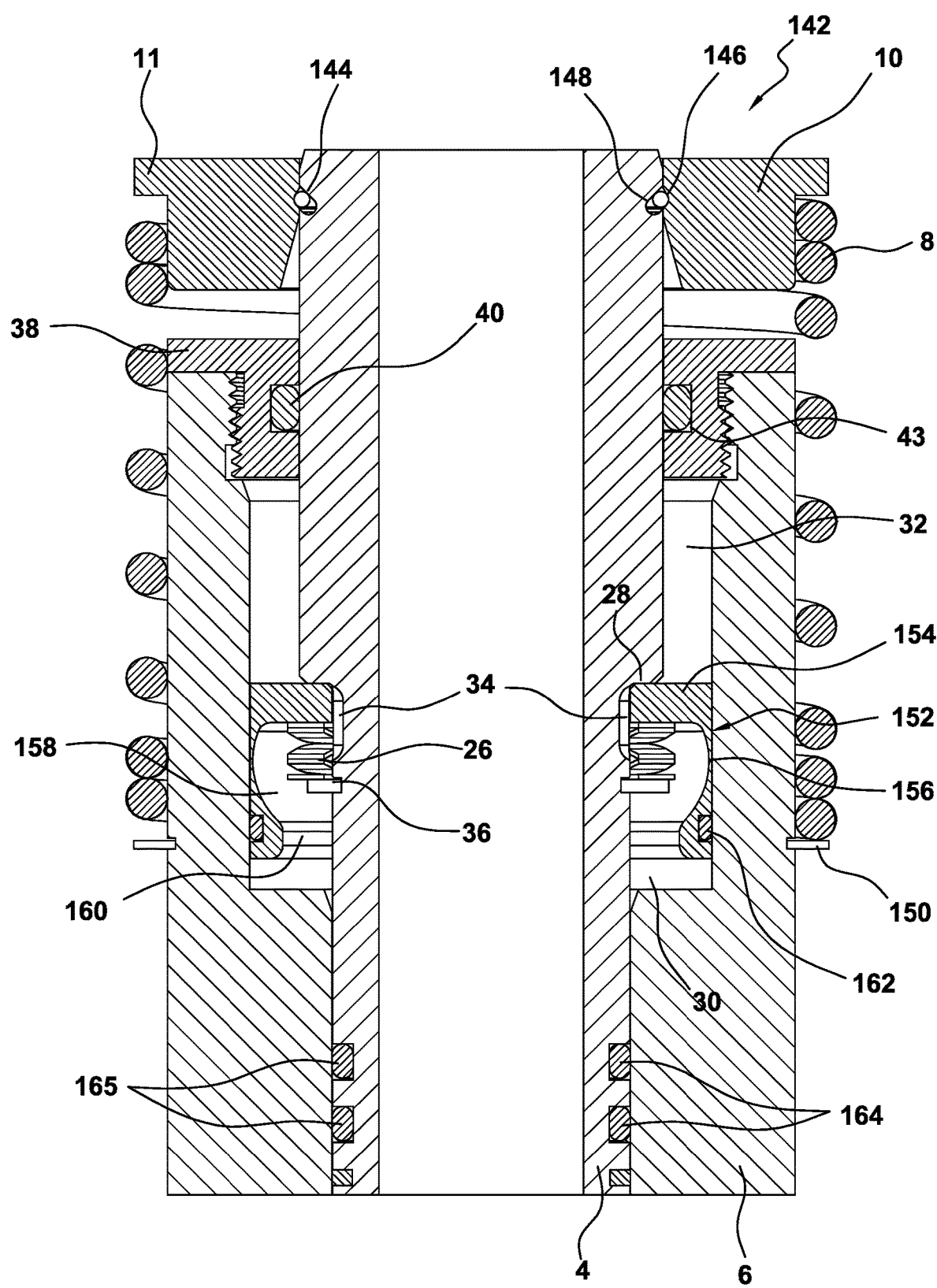
FIG. 16 is cross-sectional view of a hold-down device, embodying the present invention.

Referring to FIG. 16, another embodiment of a hydraulic expandable connector 142 is disclosed. The connector 142 includes the inner cylindrical body 4 disposed inside the outer cylindrical body 6. The retainer ring 10 shown in FIG. 1 is modified. Removable attachment of the retainer ring 10 to the inner cylindrical body 4 is implemented with a circular spring 144 that is received in both the retainer ring 10 and the inner cylindrical body 4 in cooperating circumferential grooves 146 and 148. The spring 144 locks the retainer ring 10 in the upward direction but allows the retainer ring 10 to be slipped downwardly. The operation of the spring 144 and the grooves 146 and 148 is further described in several patents, such as U.S. Pat. Nos. 6,951,078, 7,762,030 and 8,136,318, hereby incorporated by reference. The spring 8 is retained around the outer cylindrical body 6 by a retainer ring 150 and the projecting portion 11. The spring 8 urges the inner cylindrical body 4, via the retainer ring 10, in the upward direction to take up any slack that may develop in the tie rod 44 (see FIG. 3) due to the building wall shrinkage.

A deformable seal or piston 152 is disposed between the inner cylindrical body 4 and the outer cylindrical body 6. The deformable seal 152 includes a plate portion 154 that opens and closes the passageway 34 between the upper chamber 32 and the lower chamber 30, functioning as a valve as described above in connection with the connector 2. The deformable seal 152 also includes a deformable wall portion 156 made of a thin wall section disposed between the top end and the bottom end of the deformable seal 154. The inner portion of the deformable seal 154 has a hollowed concave portion 158 to form the deformable wall portion 156 and provides an opening 160 that connects the lower chamber 30 with the hollowed portion 158 and the deformable wall portion 156. The upper chamber 32 and the lower chamber 30 are filled with hydraulic fluid, such as mineral oi, water, etc.

The engagement of the top surface of the plate portion 154 against the seat 28 and the seal 40 seal the upper chamber 32 from the lower chamber 30. Seals 162 and 164 within annular grooves 165 in the inner cylindrical body 6 seal the lower chamber 30 from the upper chamber 32.

The connector 142 when taking up the slack that develops in the tire rod 44 works the same way as the connector 2. However, when under load, the operation is different. When the inner cylindrical body 4 is subjected to an axial downward load, the seat 28 will press on the plate portion 154, sealing the upper chamber 32 from the lower chamber 30. The fluid in the lower chamber 30 is subjected to high pressure when the connector 142 is subjected to an axial downward load, deforming the thin and deformable wall portion 156. The deformation occurs toward the outer cylindrical body 6, forcing the deformable wall portion 156 into the wall of the outer cylindrical body 6 into a locking engagement. The gap 62 (see FIG. 4B) is closed off by the pressure in the lower chamber 30 pushing the plate portion 154 against the seat 28 (see FIG. 4B) and the higher the pressure the tighter the seal becomes. The seal 162 advantageously keeps the high pressure fluid in the lower chamber 30 from leaking into the abutting surfaces between the outer cylindrical body 6 and the deformable seal 152 so that pressure behind the deformable wall portion 156 is less than the pressure in the hollowed portion 158.

The deformation of the deformable wall portion 156 advantageously provides a permanent seal that becomes tighter as more load is exerted on the inner cylindrical body 4. The deformable seal 152 advantageously makes the connector 142 fail-safe under load. In the event the seals 164 fail, the inner cylindrical body 4 will hold the load due to the locking engagement of the deformable seal 152 with the wall of the outer cylindrical body 6.

Figure 17:
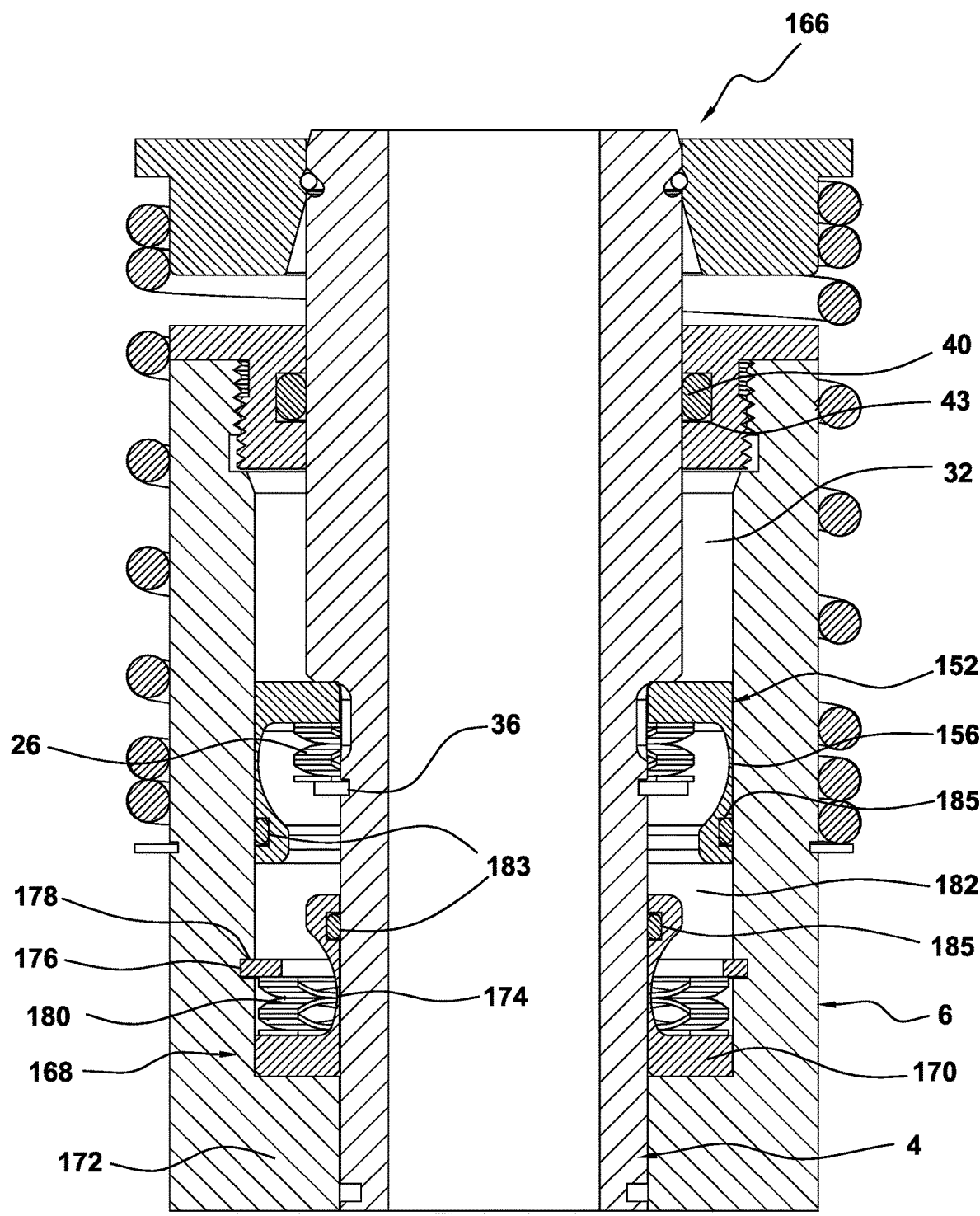
FIG. 17 is cross-sectional view of a hold-down device, embodying the present invention.

Referring to FIG. 17, another embodiment of a hydraulic expandable connector 1 is disclosed. The connector 166 is similar to the connector 142, except that the seals 164 have been replaced by a deformable seal 168 similar in construction to the deformable seal 152. The deformable seal 168 has a base portion 170 engaged against an inner shoulder 172 of the outer cylindrical body 6. The deformable seal 168 has a deformable wall portion 174 abutting the inner cylindrical body 4. A retainer ring 176 in a circumferential groove 178 holds a spring 180 that urges the base portion 170 against the should 172. A lower chamber 182 filled with hydraulic fluid is bounded by the deformable seals 152 and 168 and the inner cylindrical body 4 and outer cylindrical body 6. The upper chamber 32 is also filled with hydraulic fluid.

When an axial downward load is imposed on the inner cylindrical body 4, the fluid in the lower chamber 182 is placed under high pressure. The inner cylindrical body 4 pushes down on the deformable seal 152. The high pressure causes the deformable wall portions 156 and 174 to deform outwardly from the lower chamber 182 and onto the respective walls of the inner cylindrical body 4 and the outer cylindrical body 6, providing a strong seal. Seals 183 in annular grooves 185 in the deformable seals 152 and 168 advantageously isolate the high pressure lower chamber 182 from the rest of the connector.

Figure 18:
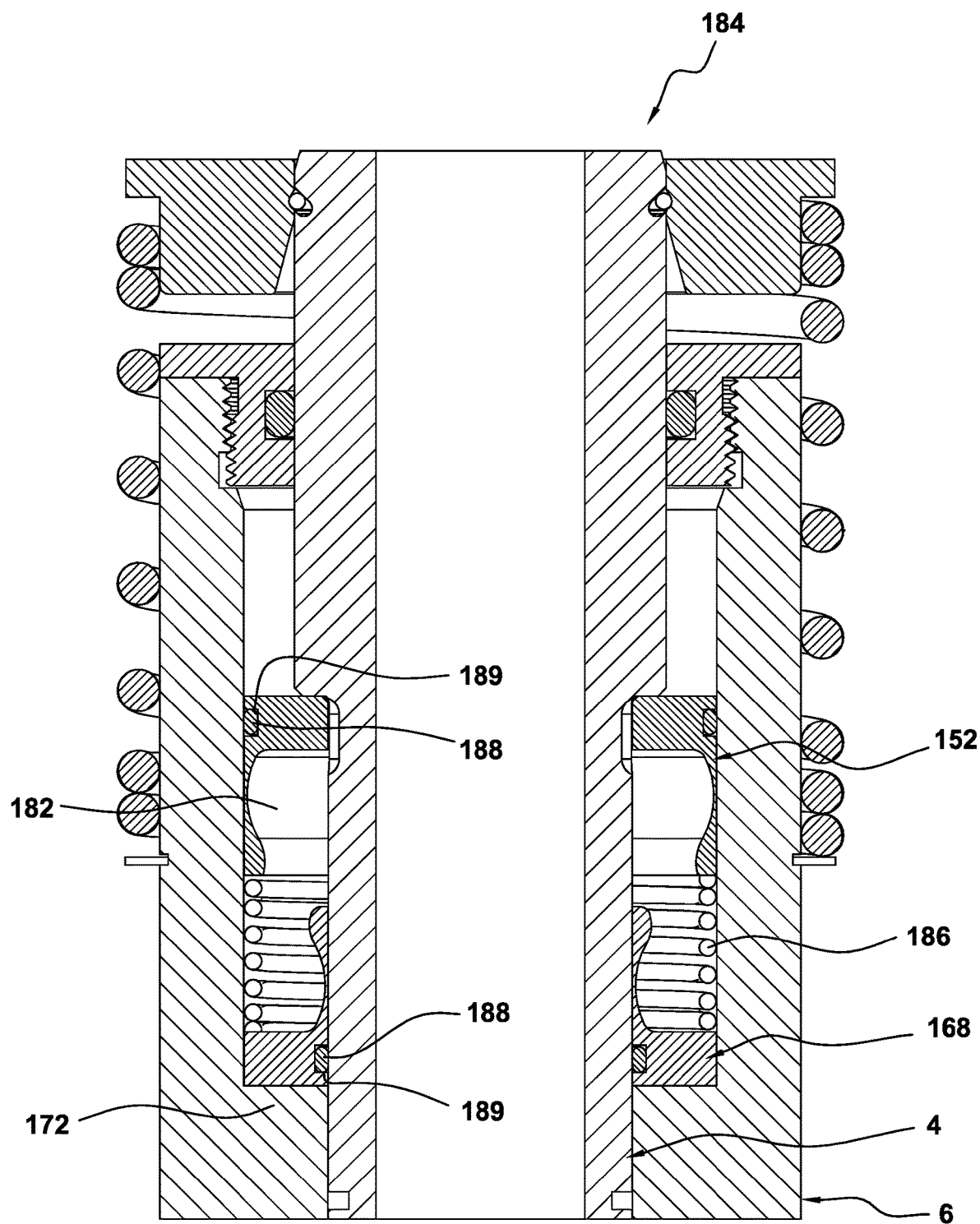
FIG. 18 is cross-sectional view of a hold-down device, embodying the present invention.

Referring to FIG. 18, another embodiment of a hydraulic expandable connector 184 is disclosed. The connector 184 is identical to the connector 166 except that the springs 26 and 180 are replaced with a single spring 186. The spring 186 pushes the upper deformable seal 152 as the inner cylindrical body 4 moves upwardly to take up slack in the tie rod 44 caused by the building wall settlement. The spring 186 also keeps the lower deformable seal 168 in contact with the shoulder 172. Seals 188 in annular grooves 189 in the upper and lower deformable seals 152 and 168 are disposed outside the high pressure fluid (under load) lower chamber 182.

Figure 19:
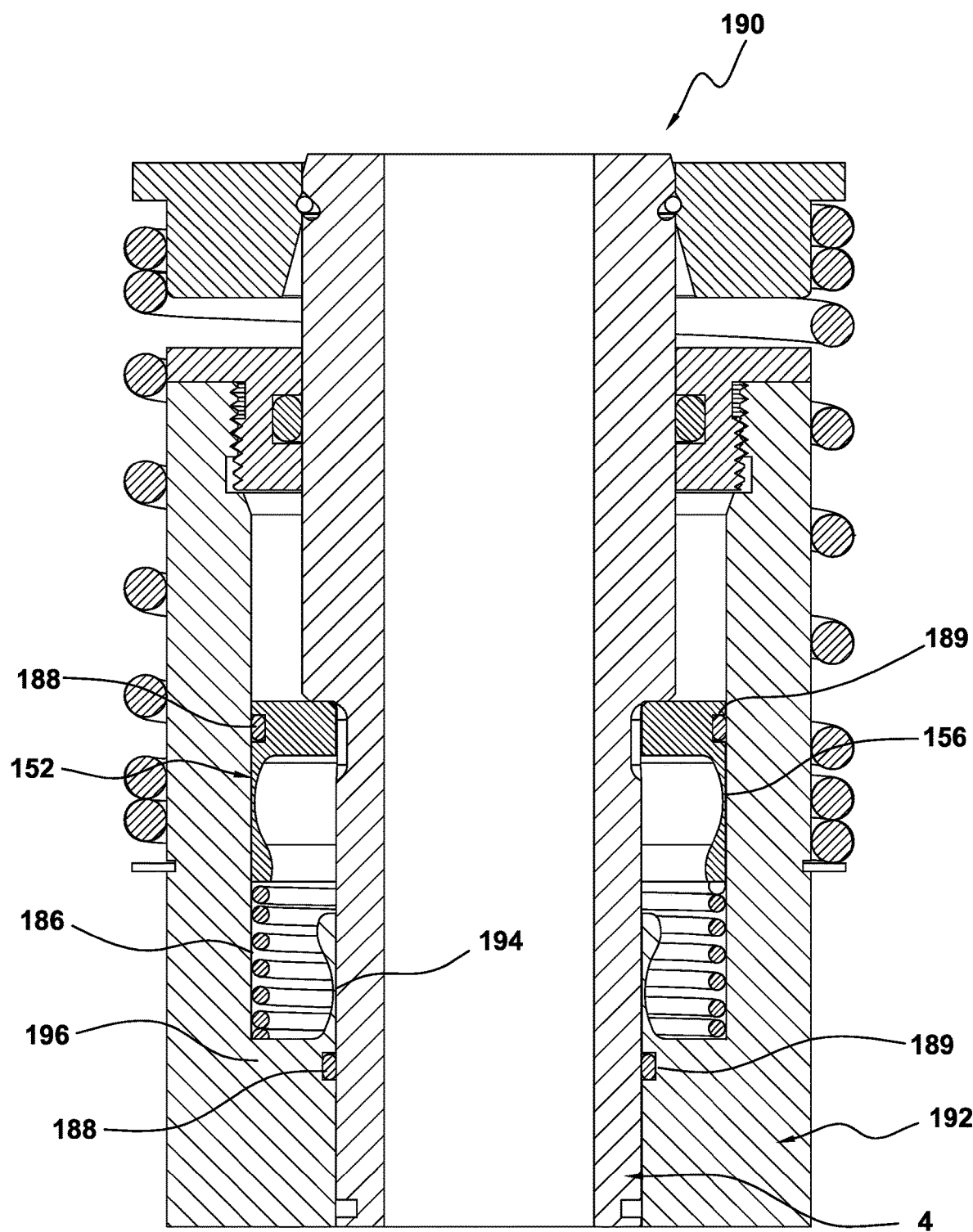
FIG. 19 is cross-sectional view of a hold-down device, embodying the present invention.

Referring to FIG. 19, another embodiment of a hydraulic expandable connector 190 is disclosed. The connector 190 is similar to the connector 184 except that the lower deformable seal 168 has been integrated into the outer cylindrical body 192. The outer cylindrical body 192 has a deformable wall portion 194 extending from a shoulder 196. The connector 190 works in the same way as the connector 184 during expansion and under load.

Figure 20:
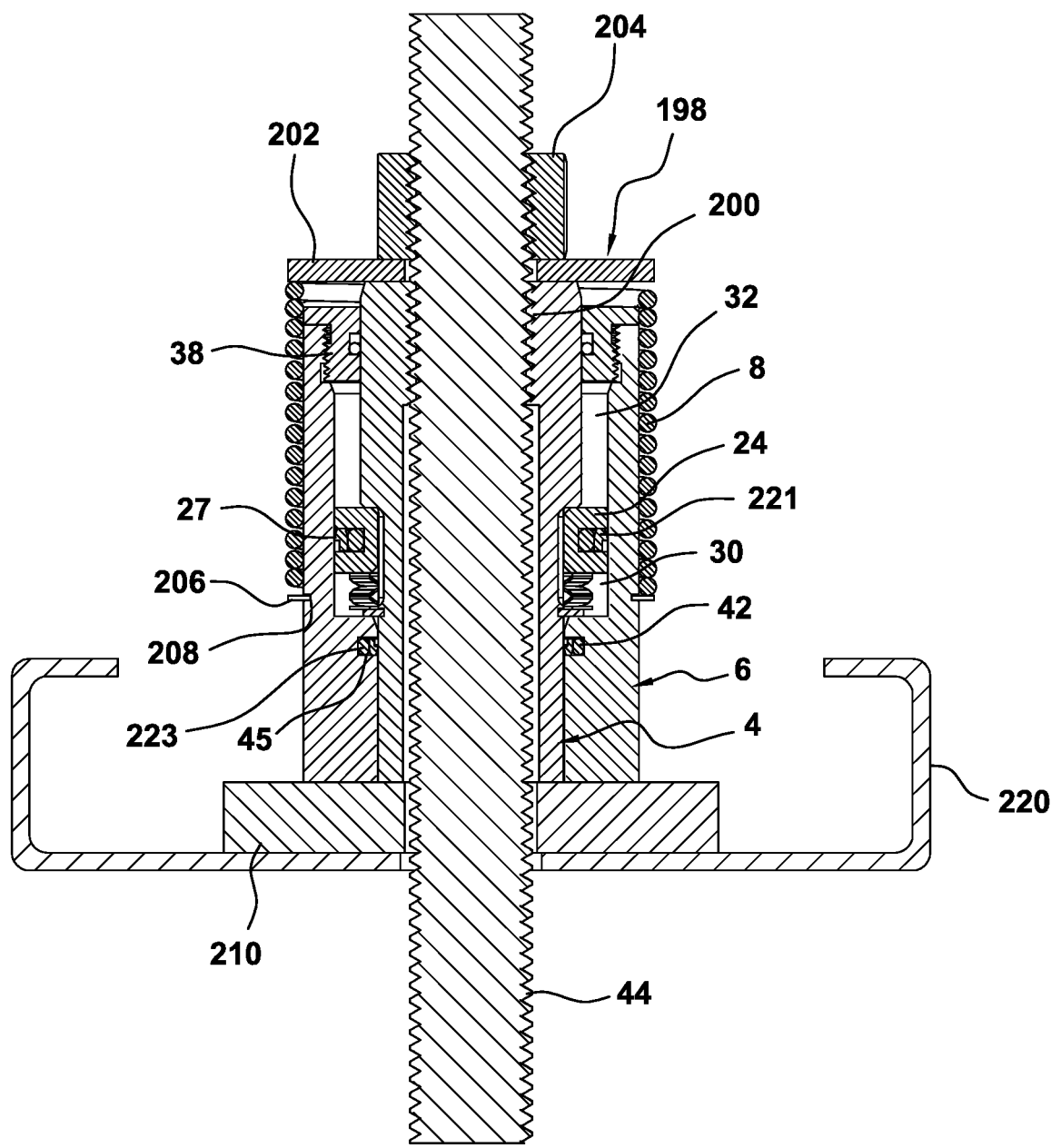

Referring to FIG. 20, another embodiment of a hydraulic expandable connector 198 is disclosed. The connector 198 is similar to the connector 2, except that the inner cylindrical body 4 is provided with internal threads 200 for threading to the tie rod 44 and the retainer ring 10 has been replaced with a washer 202. The tie rod 44 is attached to a wall foundation with an anchor and an anchor rod (see FIG. 28A). A nut 204 compresses the spring 8 via the washer 202 and retainer ring 206 held in a circumferential groove 208 in the outer cylindrical body 6. The spring 8 is compressed during installation. A bearing plate 210 is disposed on a horizontal metal framing member 220 (part of the building wall) to advantageously distribute the load over a larger area than the footprint of the connector 198. Hydraulic seal 221 in annular groove 27 in the piston 24 is used instead of an O-ring for greater sealing power. Hydraulic seal 223 in annular groove 45 in the outer cylindrical body 6 is also used instead of an O-ring for greater sealing power. Hydraulic seals are typically used in reciprocating motion applications, such as piston-cylinder assemblies.

When the building wall shrinks, the outer cylindrical body 6 moves downwardly from the action of the spring 8 while the inner cylindrical body 4 stays attached to the tie rod 44. The spring 8 may be configured with sufficient force to tension the tie rod 44. The connector 198 works the same way as the connector 2 when subjected to a downward load.

Figure 21:
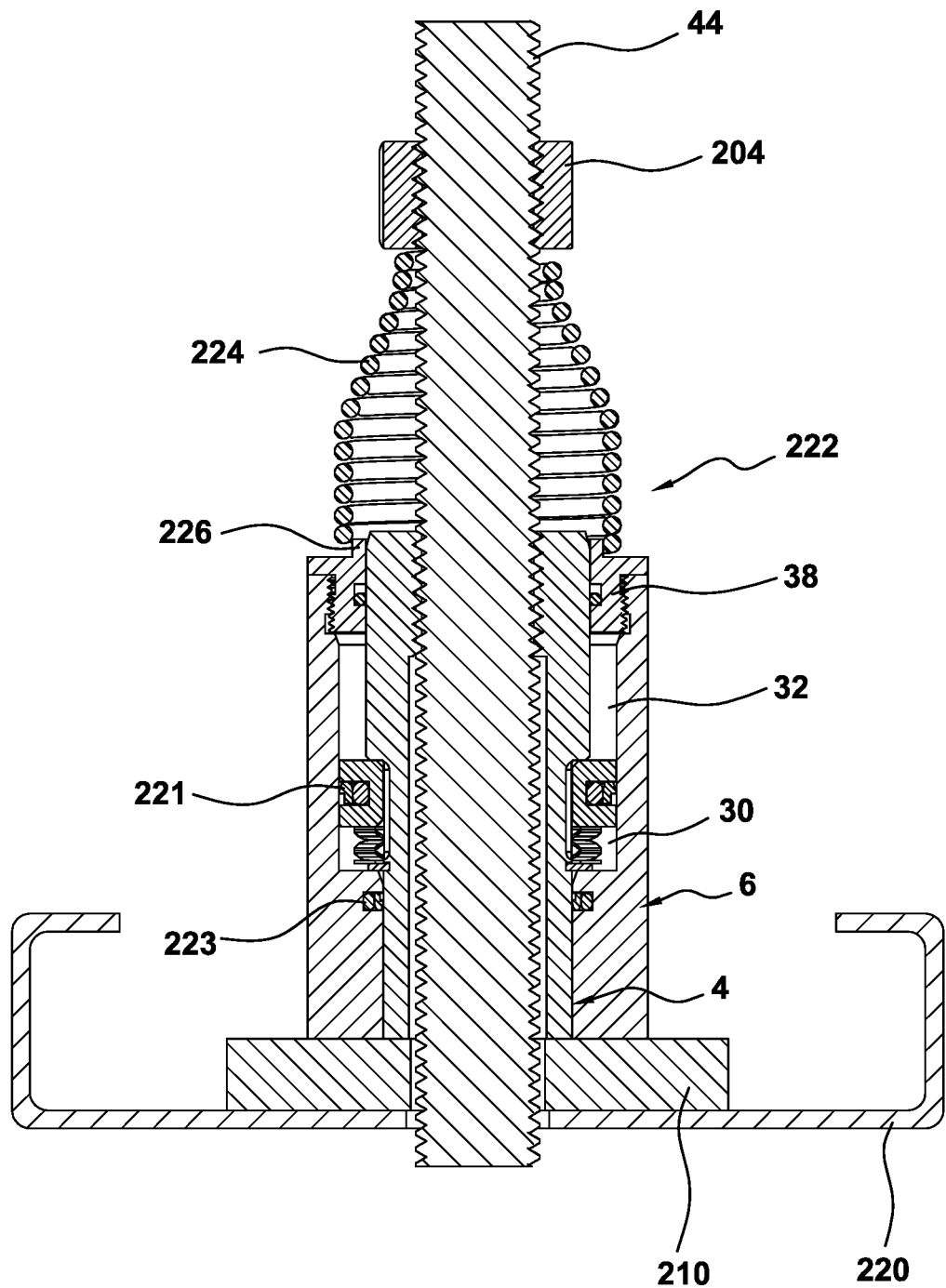
FIG. 21 is cross-sectional view of a hold-down device, embodying the present invention.

Referring to FIG. 21, another embodiment of a hydraulic expandable connector 222 is disclosed. The connector 222 is similar to the connector 198, except that the spring 8 is replaced with a conical spring 224 and the washer 202 is not used. The conical spring 224 is compressed by the nut 204 and presses on the outer cylindrical body 6 via the endcap 38, which has been provided with a collar portion 226 to center the bottom end of the spring 224 over the endcap 38.

When the building wall shrinks, the outer cylindrical body 6 moves downwardly from the action of the spring 224 while the inner cylindrical body 4 stays attached to the tie rod 44. The connector 222 works the same way as the connector 2 when subjected to a downward load.

Figure 22:
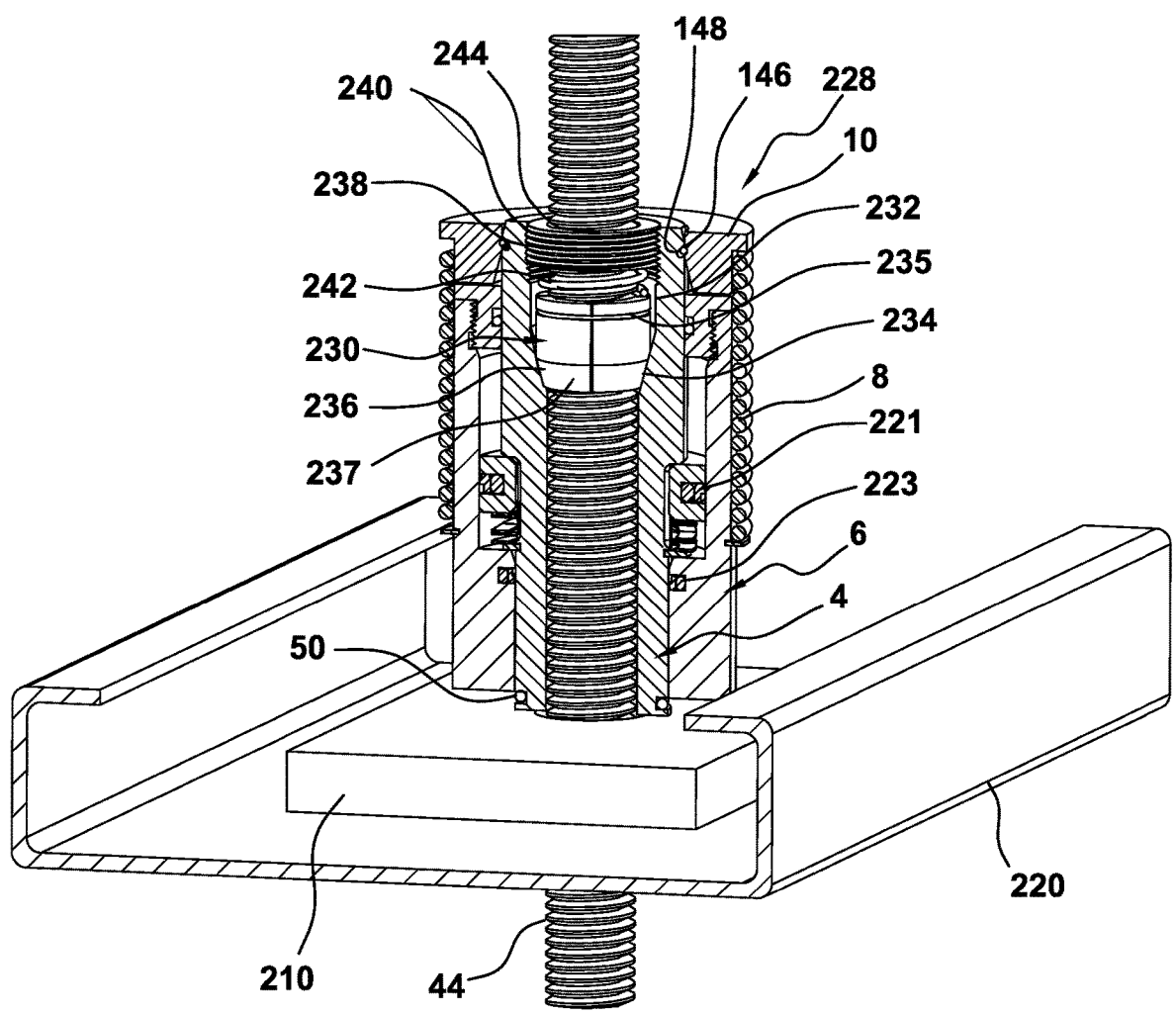
FIG. 22 is a perspective view with portions shown in cross-section of a hold-down device, embodying the present invention.

Referring to FIG. 22, another embodiment of a hydraulic expandable connector 228 is disclosed. The connector 228 is similar to the connector 2, except that the inner cylindrical body 4 is modified to accept a split cylindrical nut 230 threadedly attached to the tie rod 44. The tie rod 44 is attached to a wall foundation with an anchor and an anchor rod (see FIG. 28A). The inner cylindrical body 4 an enlarged opening 232 that narrows into a conical opening 234.

The cylindrical split nut 230 is made up of preferably four equal segments 236 with inner threads that mate with the threads of the tie rod 44. The segments 236 are bundled together by a circular spring 235. The cylindrical split nut 230 has conical portions 237 that mate with the conical opening 234. A retainer ring 238 is threaded to a threaded portion 240 of the opening 232. The retainer ring 238 compresses a spring 242 to urge the cylindrical split nut 230 downwardly into the conical opening 234. The retainer ring 238 has an unthreaded opening 244 allows the tie rod 44 to move axially through the opening 244. The clip 50 is removed after the connector is installed to allow the inner cylindrical body 4 to move relative to the outer cylindrical body 6.

When the building wall in which the connector 228 is installed shrinks, the outer cylindrical body 6 moves downwardly with the wall from the action of the spring 8. The inner cylindrical body 4 urges the cylindrical split nut 230 upwardly through the action of the spring 8. The cylindrical split nut 230 advantageously reduces the amount of time of installation since the segments 236 are simply dropped into the opening 232 instead of being screwed down from the end of the tie rod 44 as with a standard nut. The opening 232 is larger than the diameter of the cylindrical portion of the cylindrical split nut 230 so that the segments 236 can radially expand and disengage from the threads of the tie rod as the connector 228 is slid down the tie rod during installation. Split nuts are disclosed in U.S. Pat. Nos. 9,303,399 and 9,222,251 and application Ser. No. 15/265,613, all of which are hereby incorporated by reference.

Figure 23:
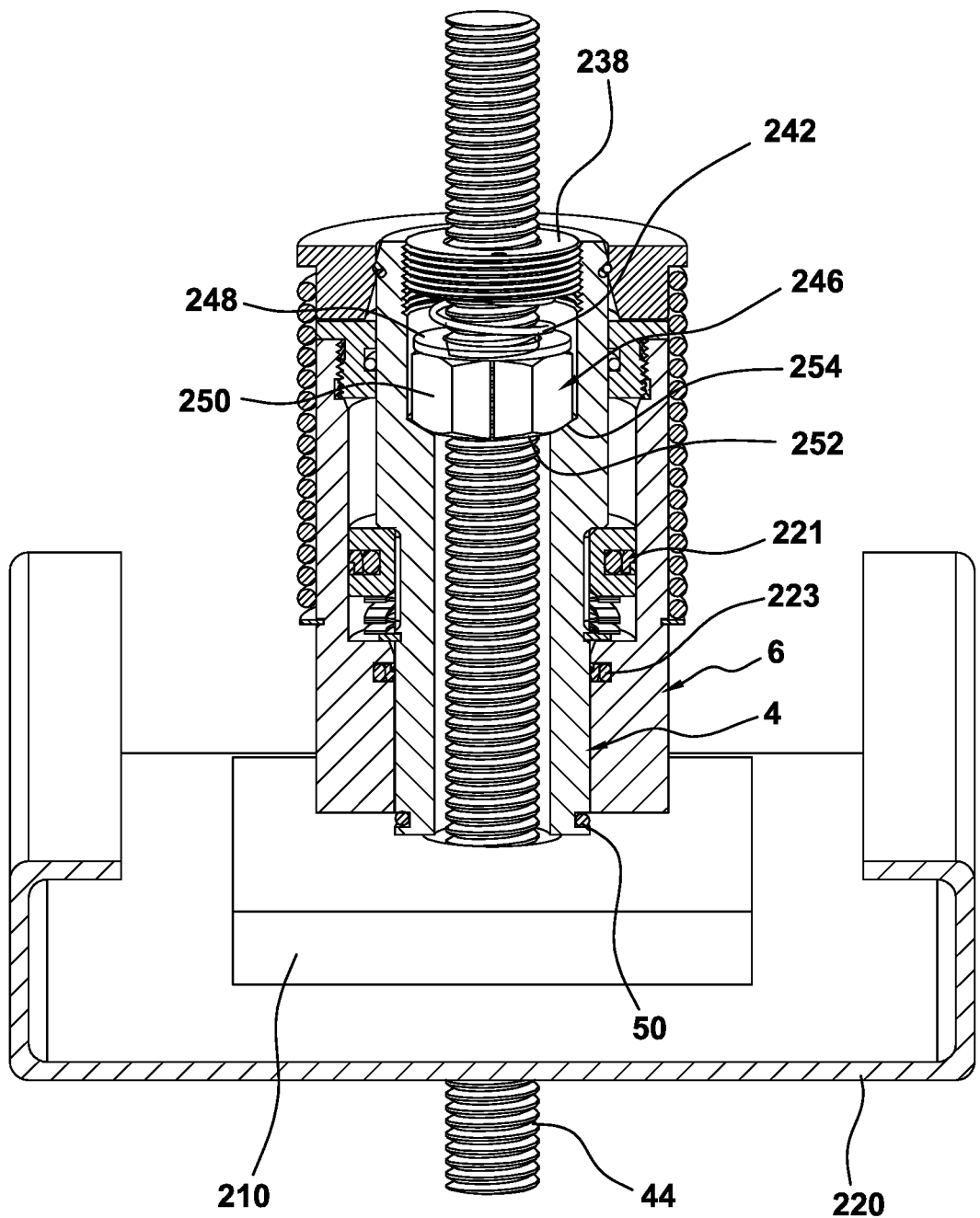
FIG. 23 is a perspective view with portions shown in cross-section of a hold-down device, embodying the present invention.

Referring to FIG. 23, the conical opening 234 in the inner cylindrical body 4 of the connector 228 is modified to work with a hexagonal split nut 246. A washer 248 distributes the force of the spring 242 over the segments 250 of the split nut 246. The opening 232 has a rounded outer edge 252 that cooperates with a complementarily rounded surface 254 that serve to draw the segments 250 into threaded engagement with the threads of the tie rod 44.

Figure 24:
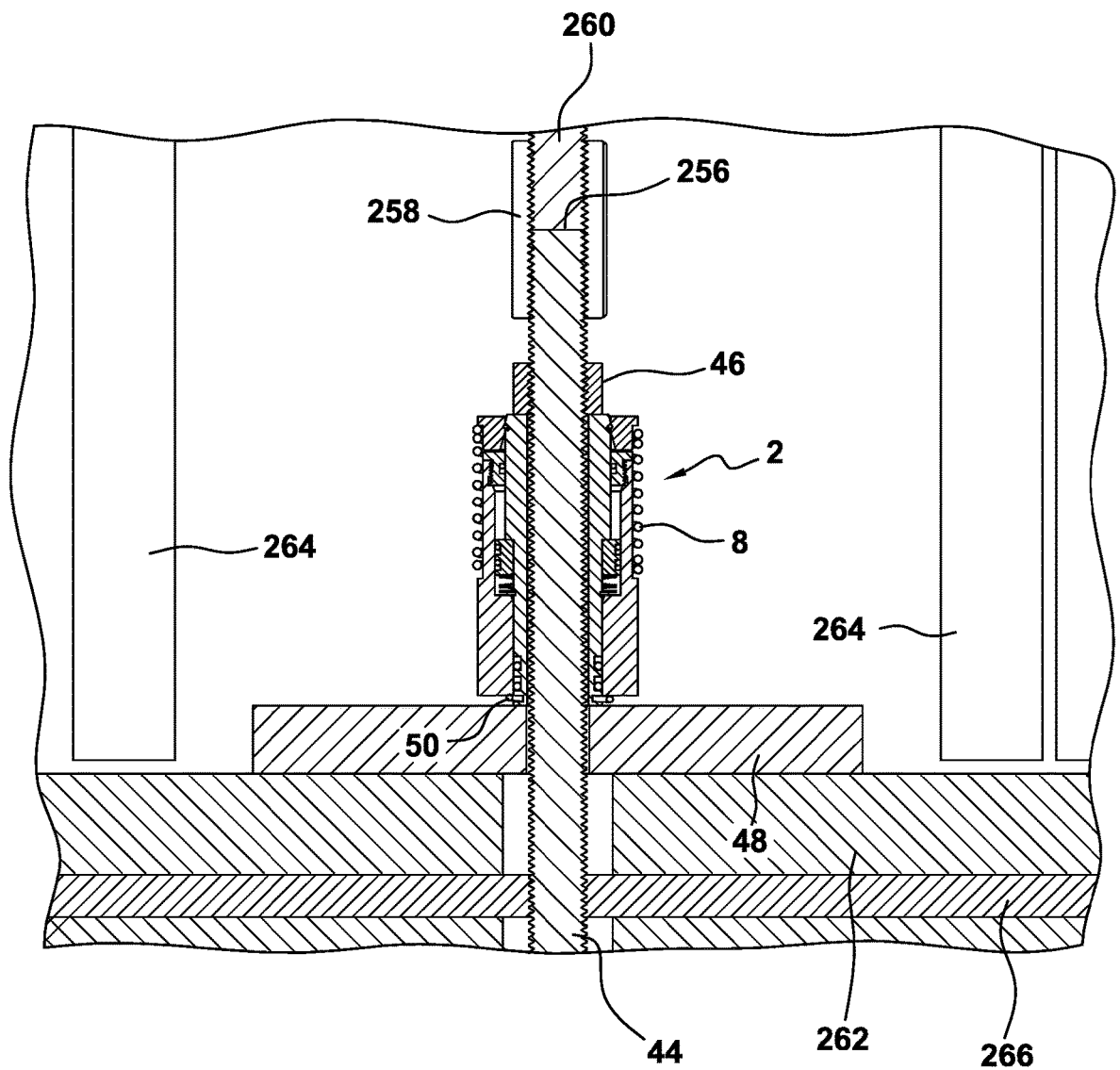
FIG. 24 is a cross-sectional view of the hold-down device shown in FIG. 1 shown installed inside a building wall.

Referring to FIG. 24, the connector 2 or the connector 64 (see FIG. 6A) is shown installed inside a wall. The connector 2 is shown in the unactuated state since the locking clip 50 has not been removed yet. The clip 50 is removed to activate the spring 8 and hence the connector 2. The tie rod 44 is cut at the end 256 just above the nut 46 to facilitate installation of the connector 2, which is slid down the tie rod 44 at the end 256. A coupling 258 joins the tie rod 44 to another tie rod 260 to continue the run. The bearing plate 48 sits on top of a horizontal framing member, such as a base plate 262 supporting a plurality of studs 264. A sub-floor sheet 266 is below the top plate 258. The tie rod 44 is attached to a wall foundation with an anchor and an anchor rod (see FIG. 28A).

Figure 25A:
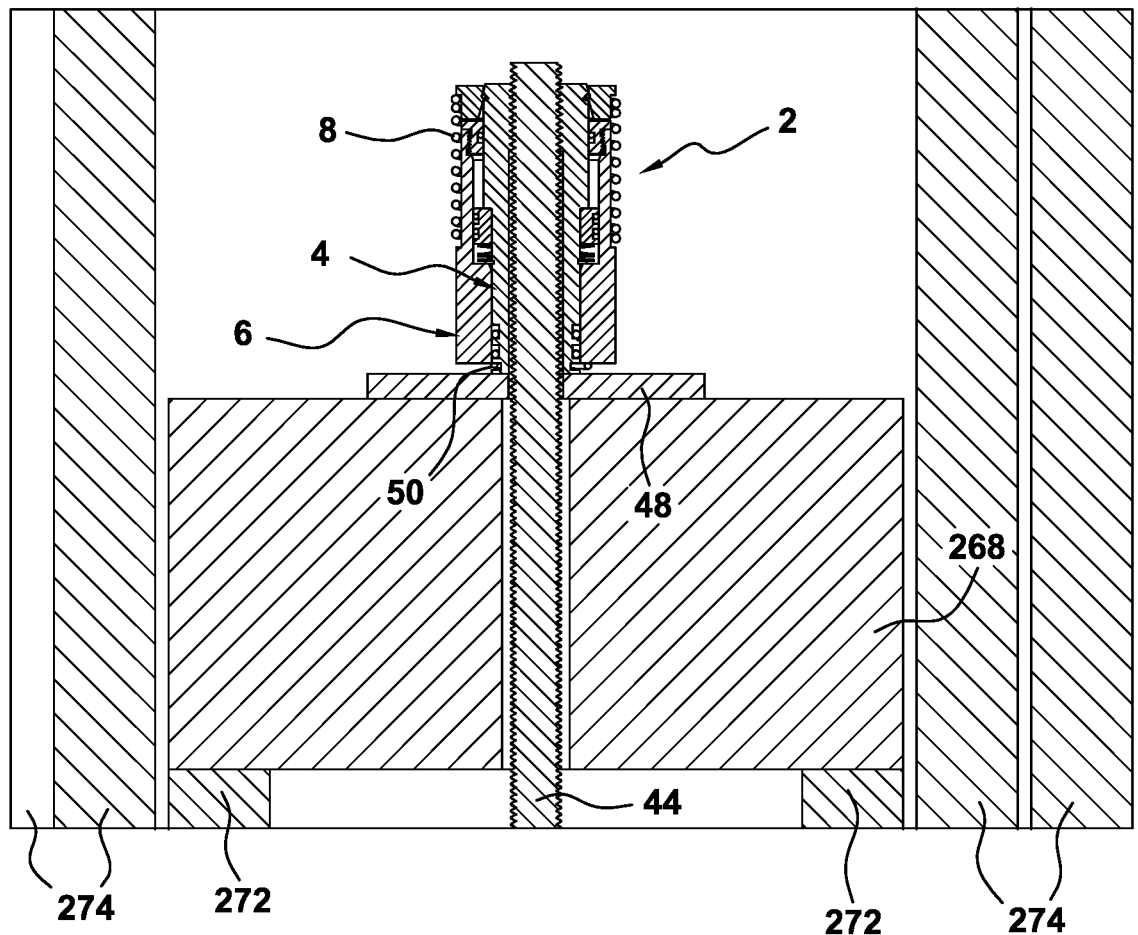
FIGS. 25A-25B are perspective views with portions shown in cross-section of the hold-down device shown in FIG. 1 shown installed inside a building wall over a cross-member.
Figure 25B:
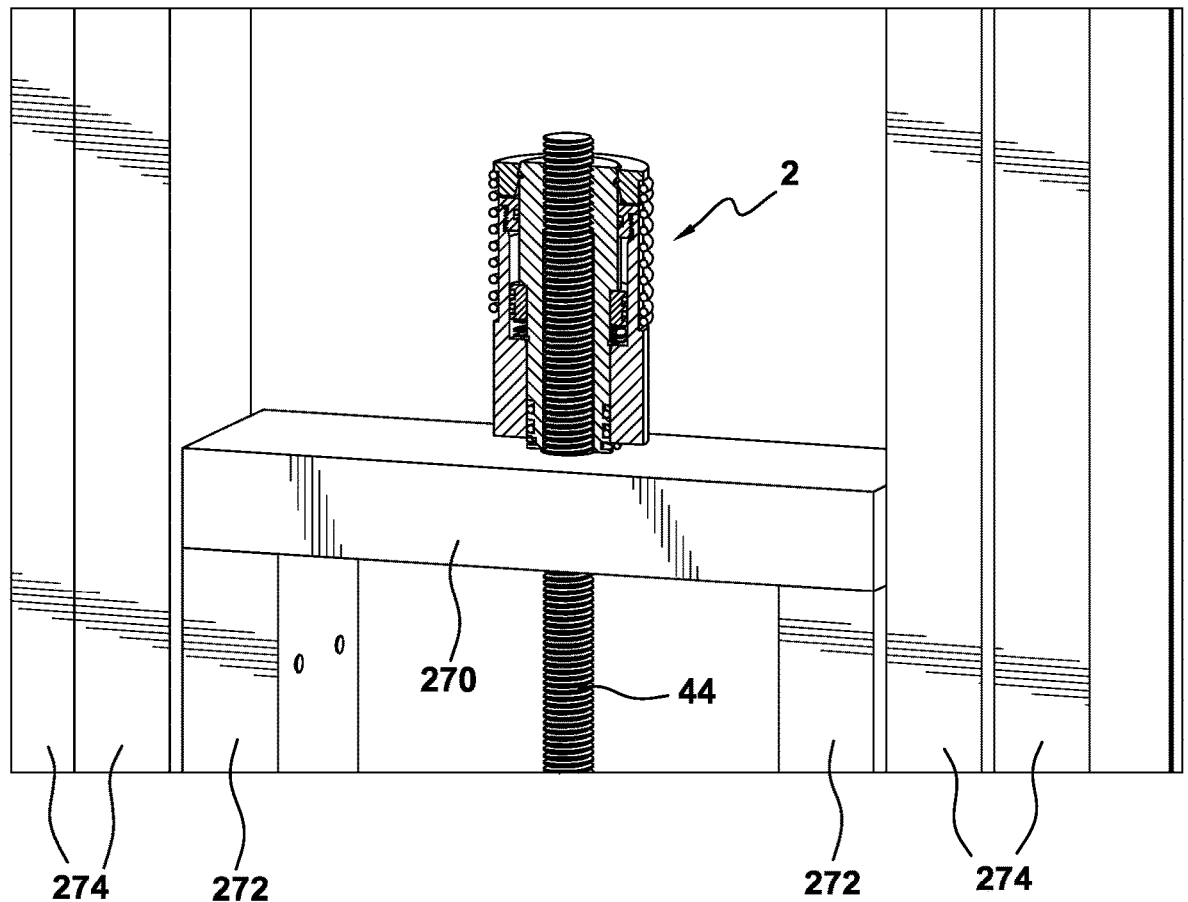

Referring to FIGS. 25A and 25B, the connector 2 or the connector 64 (not shown but see FIG. 6A) is shown installed over a horizontal framing member, such as a wood bridge member 268 or a metallic bridge member 270 supported on top of jack or reinforcement studs 272 attached to king studs 274. The inner cylindrical body 4 is threadedly attached to the tie rod 44. The tie rod 44 is attached to a wall foundation with an anchor and an anchor rod (see FIG. 28A). The spring 8 moves the outer cylindrical body 6 as the wall shrinks or settles downwardly. The clip 50 is removed to activate the connector 2.

Figure 26:
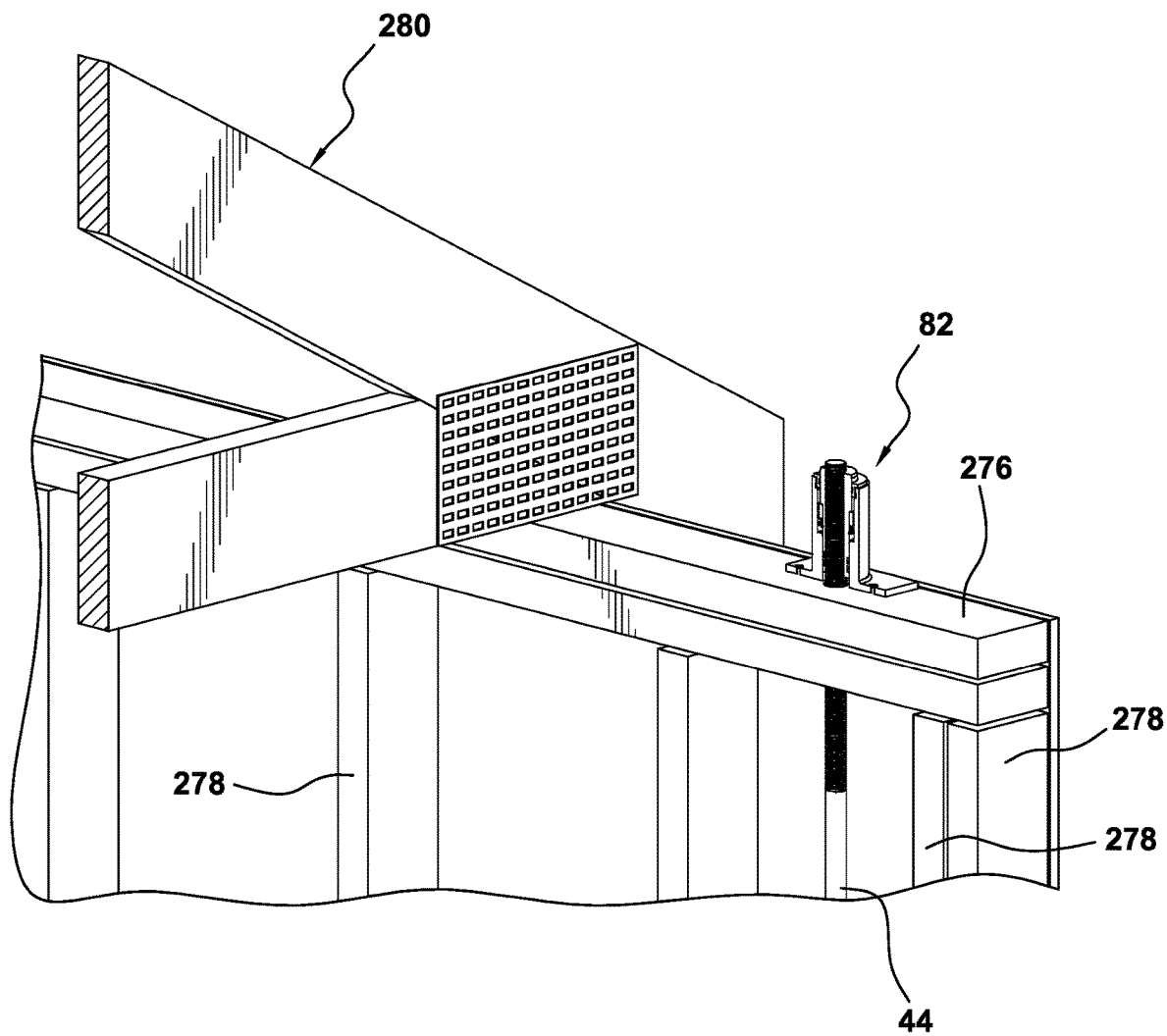
FIG. 26 is a perspective view with portions shown in cross-section of the hold-down device shown in FIG. 9 shown installed over a top plate of a building wall.

Referring to FIG. 26, the connector 82 (see FIG. 9) is attached to a horizontal framing member, such as a double top plate 276 supported by a plurality of studs 278. A plurality of roof rafters 280 (one shown) is supported by the double top plate 276. It should be understood that other connectors disclosed herein may also be installed in lieu of the connector 82. The tie rod 44 is attached to a wall foundation with an anchor and an anchor rod (see FIG. 28A).

Figure 27:
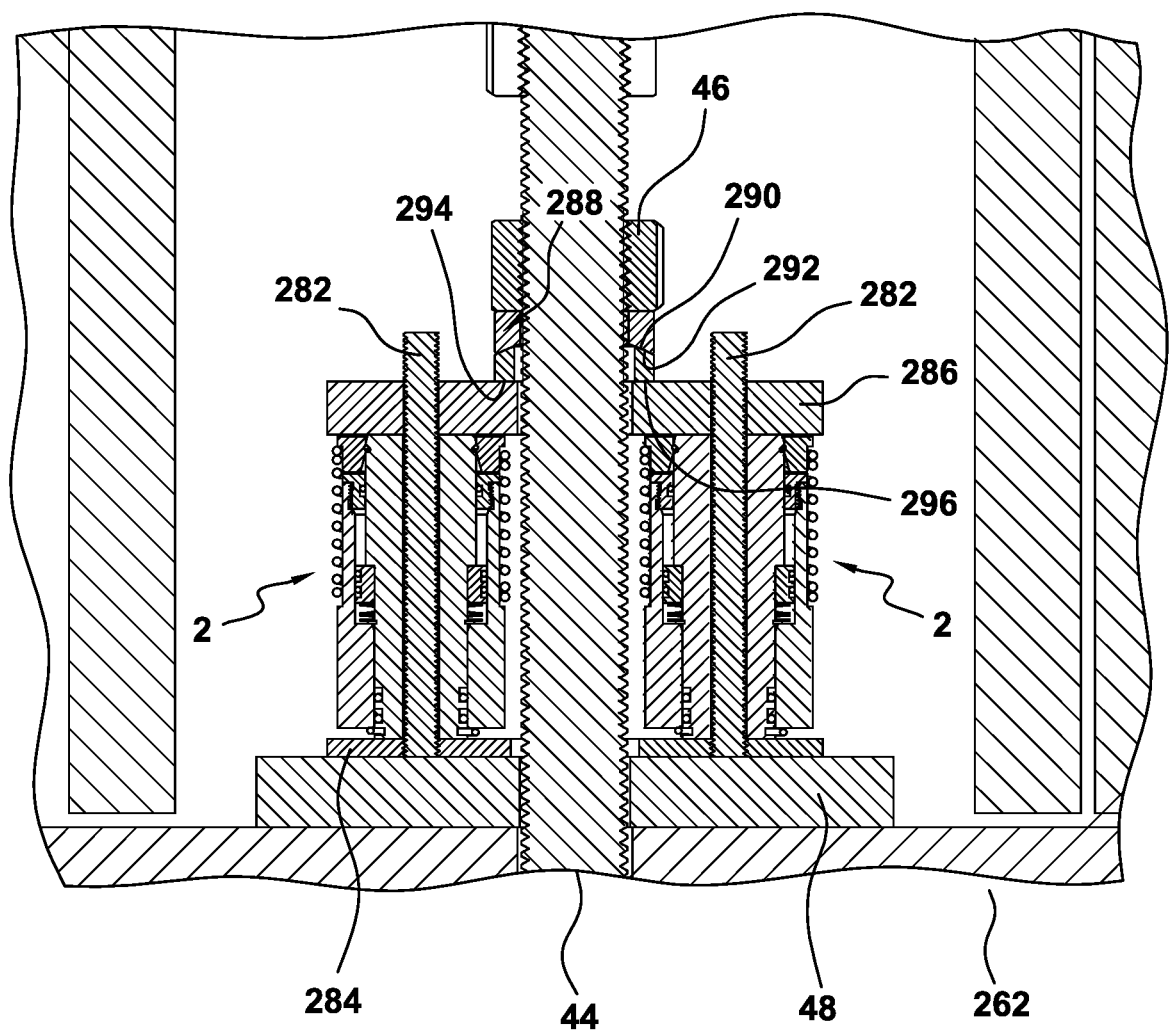
FIG. 27 is a cross-sectional view of two hold-down devices shown in FIG. 1 installed in tandem inside a building wall.

Referring FIG. 27, two connectors 2 are shown attached in tandem inside a wall over the bottom plate 262. The connectors 2 are installed on either side of the tie rod 44. The tie rod 44 is attached to a wall foundation with an anchor and an anchor rod (see FIG. 28A). Threaded rods 282 attached to a base plate 284 guide the respective connectors 2 as they expand. A top plate 286 distributes the load from the tie rod 44 over the two connectors 2. Use of the tandem arrangement advantageously allows the use of the connectors 2 with smaller axial openings than the diameter of the tie rod 44. With smaller axial openings, the overall outside diameter of the connectors 2 is advantageously reduced to fit in smaller spaces. The load is also distributed over the two connectors 2, advantageously requiring less load capability for each connector. Swivel washers 288 with complementary concave surface 290 and convex surface 292 advantageously allow the tie rod 44 to be misaligned from the vertical while keeping the contact surface 294 of the swivel washers flat on the contact surface 296 of the top plate 286. The nut 46 holds applies tension on the tie rod 44. The swivel washers 288 and the tandem arrangement of the connectors 2 are also disclosed in application Ser. No. 15/265,613, filed Sep. 14, 2016, hereby incorporated by reference. It should be understood that other embodiments of the connector disclosed herein, such as the connector 64, 70, 82, 94, 142, 166, 184, 190, 222, 228, etc., may be used in the tandem configuration.

Figure 28A:
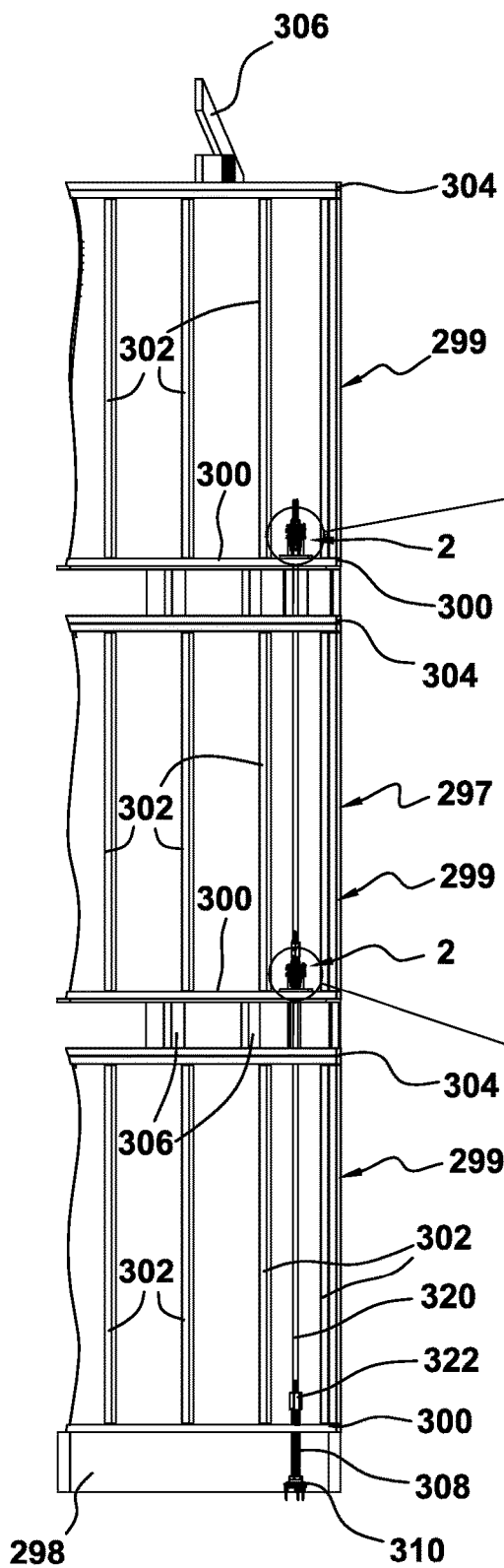
FIG. 28A is cross-sectional view of a three-level building wall incorporating multiple hold-down devices shown in FIG. 1.
Figure 28B:
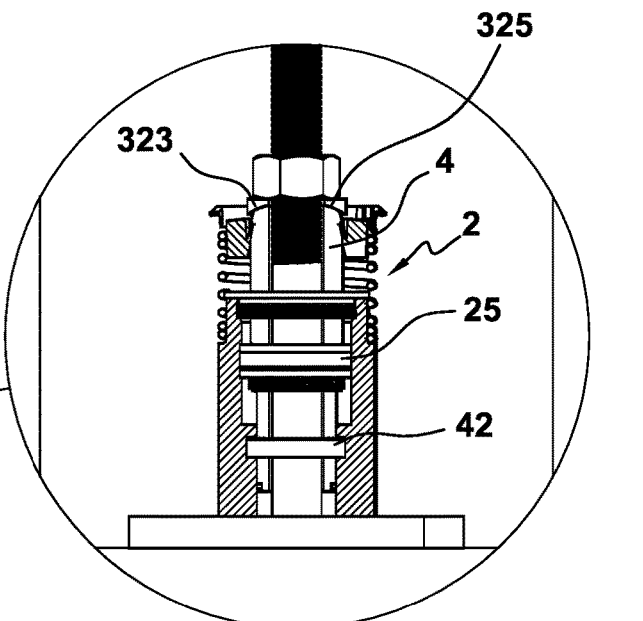
FIGS. 28B-28C are enlarged views in cross-section of portions taken from FIG. 28A.
Figure 28C:
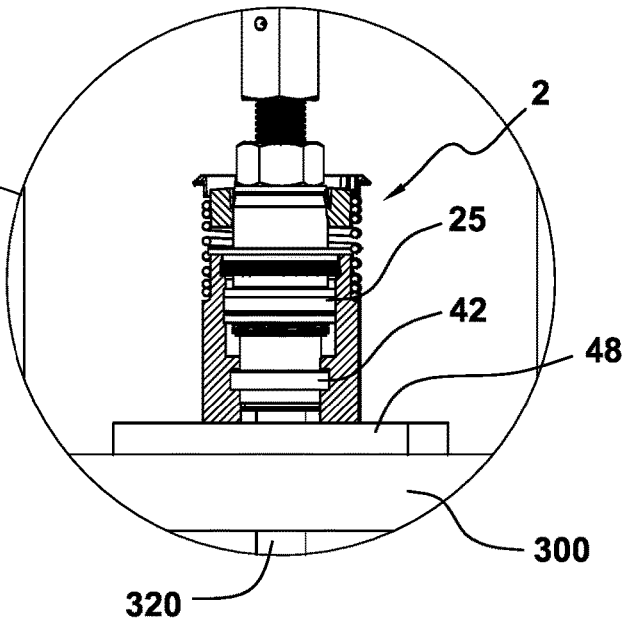

Referring to FIGS. 28A, 28B and 28C, a three-level wall 297 is shown anchored to a foundation 298 with two connectors 2. The wall is standard construction. Each section 299 of the wall includes a bottom plate 300, a plurality of studs 302 and a double top plate 304. Floor joists 306 between the lower wall section and the upper wall section are supported on the respective double top plates 304. Roof rafters (one shown) 306 are supported by the top plates of the top wall section.

An anchor rod 308 is attached to an anchor 310 embedded in the foundation 298. A tie rod 320 with threaded end portions and an unthreaded portion in between is attached to the anchor rod with a coupling 322. The unthreaded portions of the tie rods 302 are disposed in the openings in the double top plates 304 and bottom plates 300 to advantageously allow the floors to shrink downwardly without snagging and bowing the tie rods. In this manner, the tie rods 320 will have no slack.

The upper connector 2 as shown in FIG. 28B has a longer travel length of expansion than the lower connector 2 as shown in FIG. 28C, since the upper connector 2 is to accommodate the cumulative shrinkage of the floors below. The inner cylindrical body 4 of the connector 2 of FIG. 28B has a convex upper edge surface 323 that cooperates with a swivel washer with a complementary shaped bottom surface 325 to advantageously allow the misalignment from the vertical of the tie rod 320. Since the connector 2 of FIG. 28B is located furthest from the foundation 298, small misalignment or displacement as measured in arc length from the vertical of the tie rod 320 grows by the time it reaches to the position of the connector 2 on the third level of the wall 297.

Figures 29A, 29B, 29C:
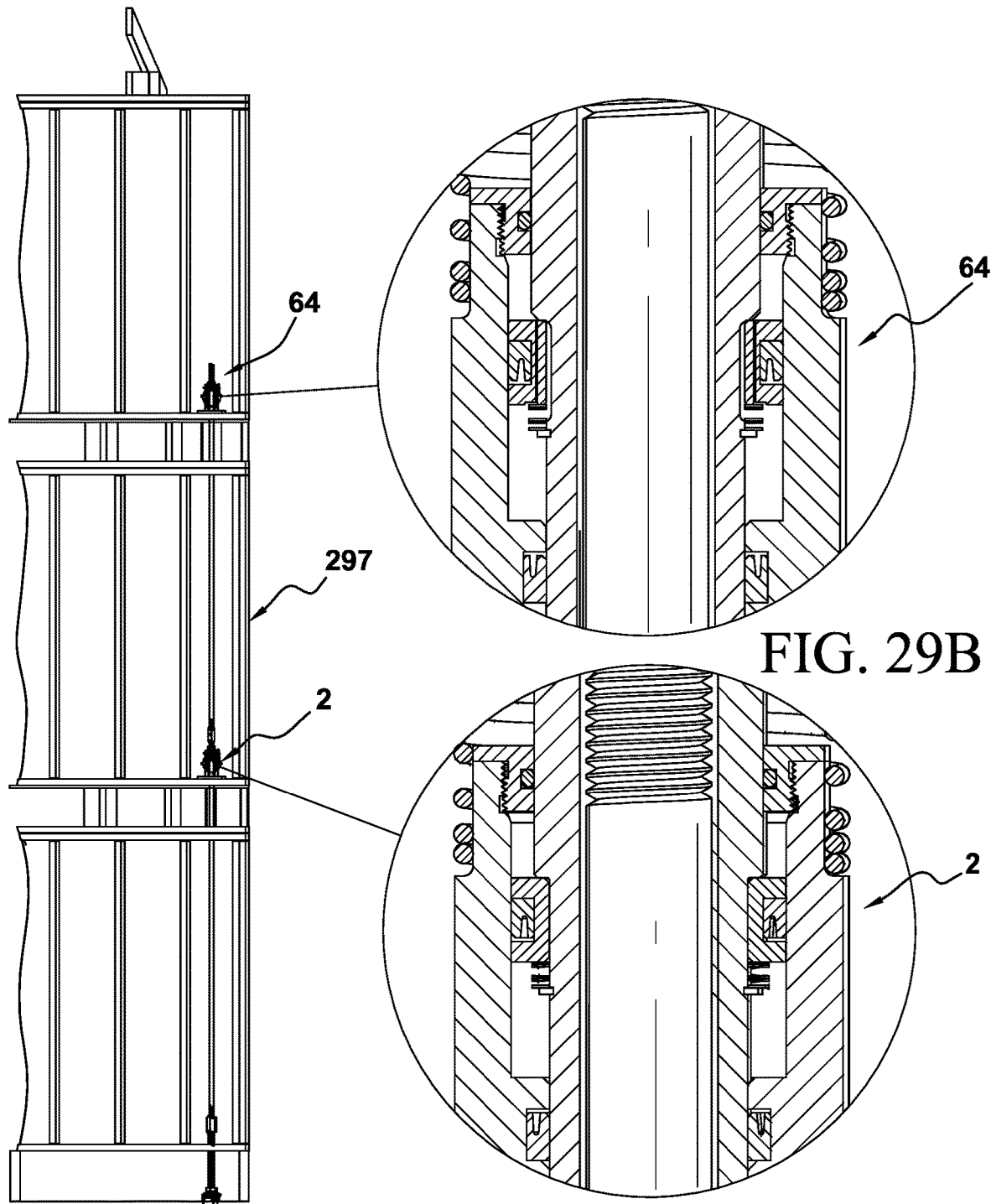
FIG. 29A is cross-sectional view of a three-level building wall incorporating the hold-down devices shown in FIGS. 1 and 6A.
FIGS. 29B-29C are enlarged views in cross-section of portions taken from FIG. 29A.

Referring to FIGS. 29A, 29B and 29C, the upper connector 2 shown in FIG. 28A is replaced with the connector 64 (see FIG. 6A).

Figure 30:
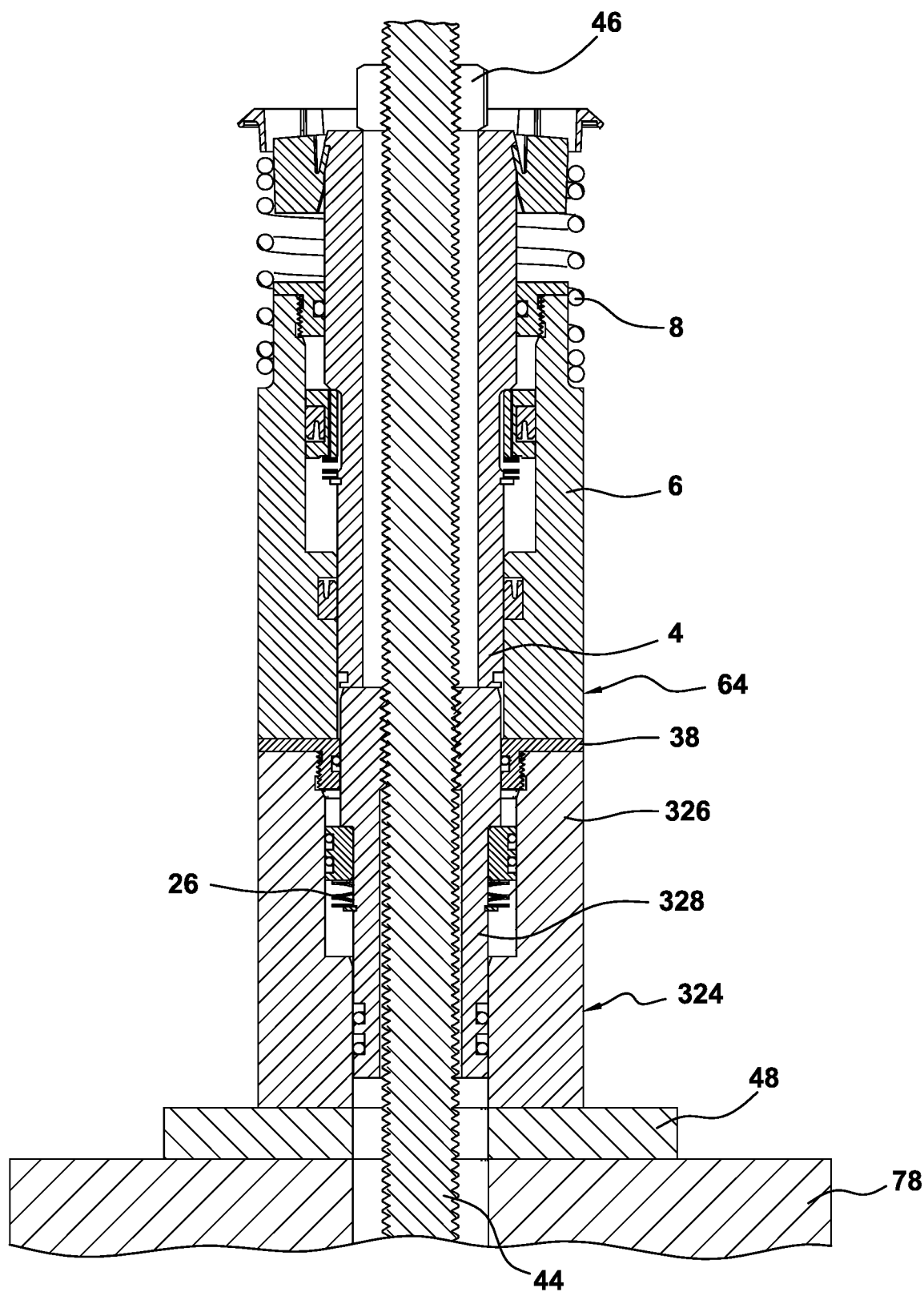
FIG. 30 is a cross-sectional view of the hold-down device shown in FIG. 6A disposed on top of another hold-down device.

Referring to FIG. 30, the connector 64 is disposed on top of a connector 324, which is similar to the connector 70, except that the outer cylindrical body 326 is not attached to the bearing plate 48. The bearing plate 74 is also not attached to the wall structure 78. The inner cylindrical body 328 is threaded to the tie rod 77 and extends into the connector 64, engaging the inner cylindrical body 4 of the connector 64. The outer cylindrical body 6 of the connector 64 engages the endcap 38 of the connector 324. The nut 46 attaches the connector 64 to the tie rod 44. The tie rod 44 is attached to a wall foundation with an anchor and an anchor rod (see FIG. 28A). The spring 8 is used to actuate both connectors 4 and 64. When the building wall shrinks, the inner cylindrical body 328 moves upwardly relative to the wall structure 78, pushing the inner cylindrical body 4 upwardly. The spring 8 then pushes the outer cylindrical bodies 6 and 326 downwardly to take up the amount of shrinkage. Even after the lower connector 324 has bottomed out or failed, the upper connector 64 will still function to dampen any load on the tie rod 44.

Figure 31:
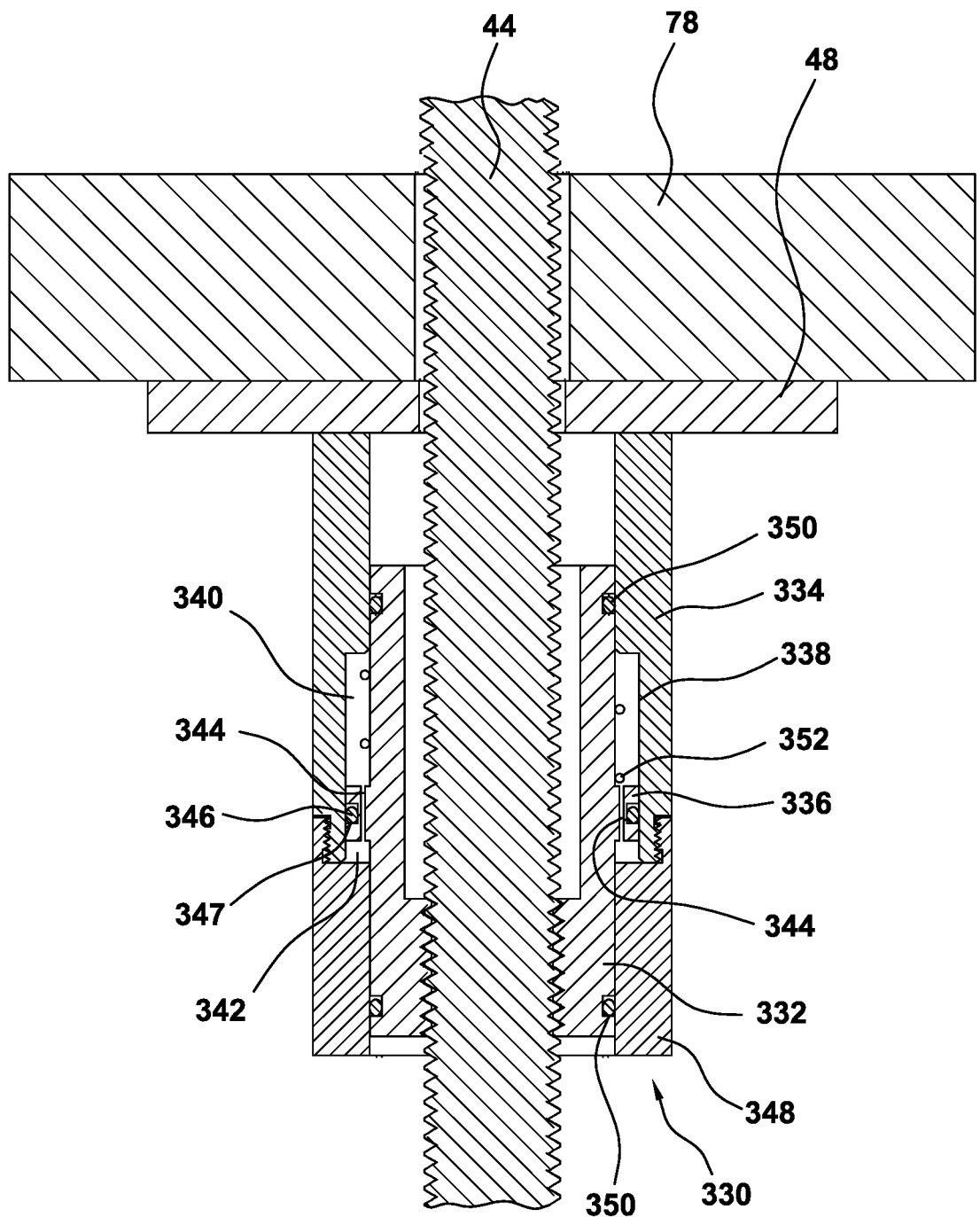
FIG. 31 is cross-sectional view of an inverted hold-down device attached below a wall structure.

Referring to FIG. 31, another embodiment of a hydraulic expandable connector 330 is disclosed. The connector 330 is disposed inverted below and hanging from the wall structure 78. The connector 330 has an inner cylindrical body 332 within an outer cylindrical body 334. A piston portion 336, preferably integral with the inner cylindrical body 332, extends radially outwardly and slidably engages an inner wall 338 of the outer cylindrical body 334. The piston portion 336 defines an upper chamber 340 and a lower chamber 342 between the inner wall 338 and the inner cylindrical body 332. The chambers 340 and 342 are filled with hydraulic fluid, such as mineral oi, water, etc. A plurality of openings 344 communicate with upper chamber 340 and the lower chamber 342. A seal 346, preferably an O-ring, disposed within an annular groove 347 in the piston portion 336, seals the piston portion 336 with the inner wall 338. Another outer cylindrical body 348 is threaded to the other cylindrical body 334. Seals 350, preferably O-rings, seal the inner cylindrical body 332 to the outer cylindrical bodies 334 and 348. The inner cylindrical body 332 is threaded to the tie rod 44. The tie rod 44 is attached to a wall foundation with an anchor and an anchor rod (see FIG. 28A). A spring 352 disposed within the upper chamber 340 pushes the outer cylindrical bodies 334 and 348 against the bearing plate 48. The spring 352 prevents the outer cylindrical body 334 and the bearing plate 48 from falling downwardly due to gravity.

As the building wall shrinks downwardly, the wall structure 78 moves with the wall, pushing the outer cylindrical body 334 downwardly, thereby pressurizing the fluid in the upper chamber 340. The fluid then flows through the openings 344 in a predetermined rate, depending on the size and number of the openings 344. A smaller size of the opening 344 will cause the fluid to flow slower than a larger size. A greater number of the openings 344 will cause the fluid to flow faster than a lesser number of the openings 344. Accordingly, the rate of downward movement of the wall may be predetermined.

When there is an uplift force on the wall, the tie rod 44 is pulled upwardly (tension force), causing the inner cylindrical body 332 to move upwardly, thereby pressurizing the upper chamber 340. The fluid in the upper chamber 340 flows through the openings 344 in a predetermined rate to dampen the upward movement of the tie rod 44. Accordingly, the wall cannot move faster than the rate of movement of the outer cylindrical body 334 or the inner cylindrical body 332.

Figure 32:
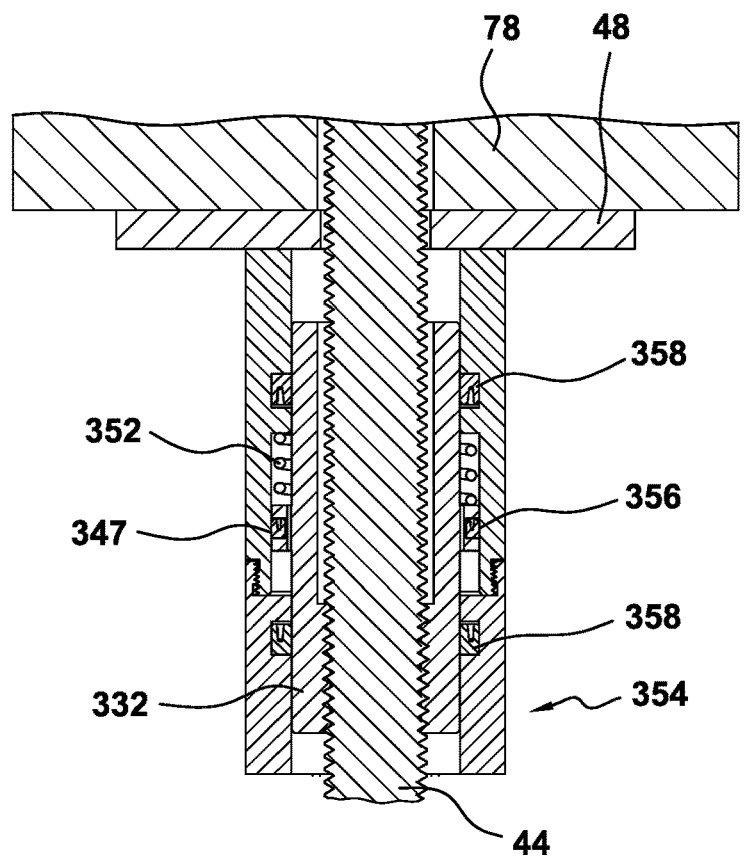
FIG. 32 is a cross-sectional view of an inverted hold-down device attached below a wall structure.

Referring to FIG. 32, the connector 330 shown in FIG. 31 is modified as connector 354 wherein the seals 344 and 350 are replaced with standard hydraulic seals 356 and 358, also known as rod seals. Hydraulic seals are typically used in reciprocating motion applications, such as piston-cylinder assemblies. The hydraulic seals 356 and 358 can withstand higher pressures than a typical O-ring seal.

Figure 33:
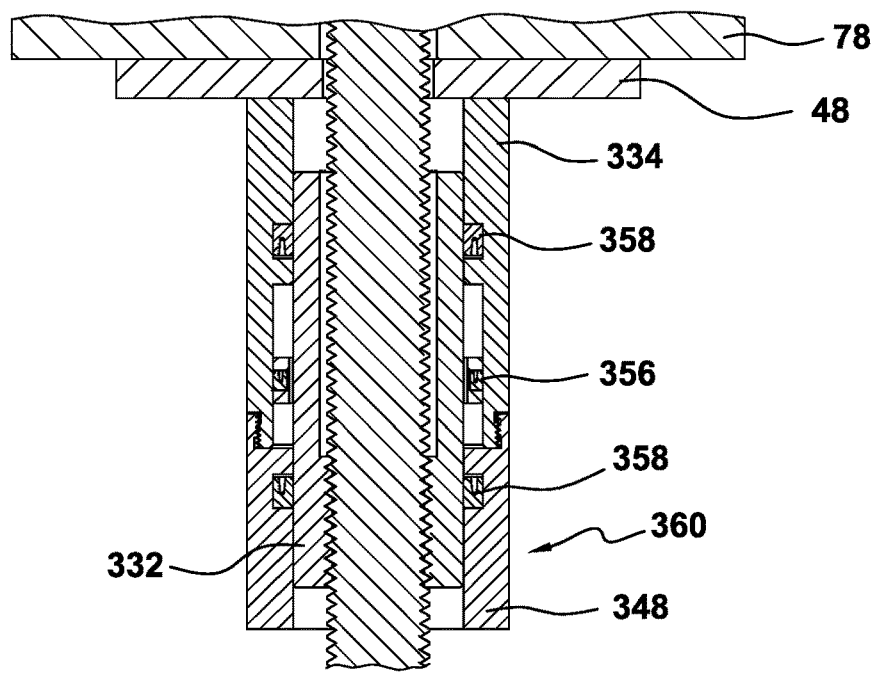
FIG. 33 is a cross-sectional view an inverted hold-down device similar to the device shown in FIG. 32.

Referring to FIG. 33, the connector 354 shown in FIG. 32 is modified as a hydraulic expandable connector 360 wherein the spring 352 is not used. The friction between the inner cylindrical body 332 and the seals 358 is sufficient to keep the outer cylindrical bodies 334 and 348 and the bearing plate 48 from falling under their own weight. The force applied to the outer cylindrical bodies 334 and 348 as the wall shrinks is enough to overcome the friction of the seals 358 and move the outer cylindrical bodies 334 and 348.

Figure 34:
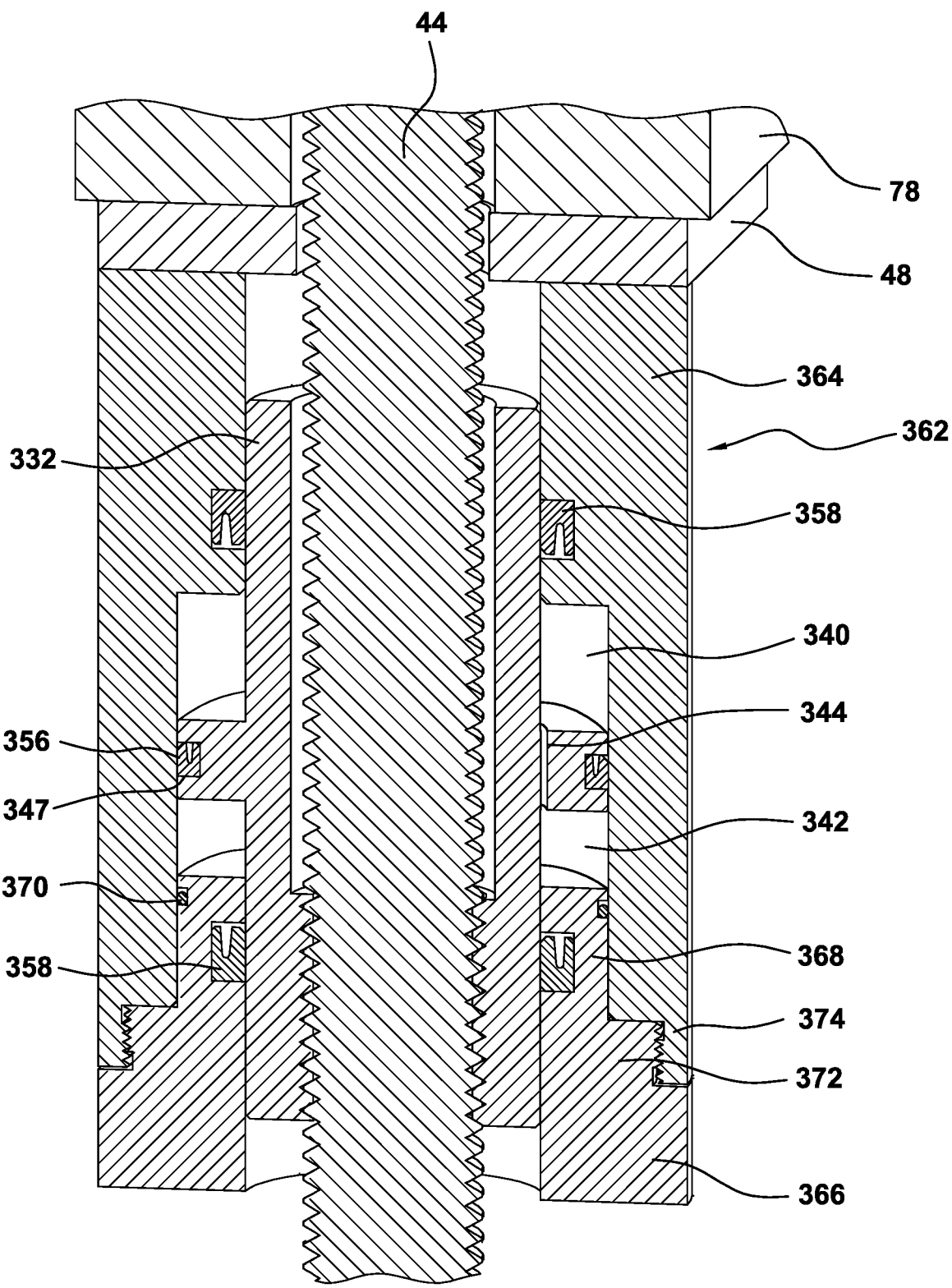
FIG. 34 is a cross-sectional view an inverted hold-down device similar to the device shown in FIG. 33.

Referring to FIG. 34, the connector 360 is modified as a hydraulic expandable connector 362 wherein the outer cylindrical body 334 and the other outer cylindrical body 348 are modified as outer cylindrical bodies 364 and 366, respectively. The outer cylindrical body 366 has a cylindrical portion 368 disposed between the inner cylindrical body 332 and the outer cylindrical body 365. A seal 370, preferably an O-ring, seals the cylindrical portion 368 against the outer cylindrical body 364. The outer cylindrical body 366 has a threaded cylindrical portion 372 that mates with a corresponding threaded cylindrical portion 374 of the outer cylindrical body 364. The threaded cylindrical portions 372 and 374 are advantageously disposed below the lower chamber 342 to provide a stronger connection between the outer cylindrical bodies 364 and 366.

Referring to FIG. 35, the building wall 297 shown in FIG. 28A is further equipped with the connectors 330. A person of ordinary skill in the art will understand that the connectors 354 or 362, which are variants of the connectors 330, may also be used. The connectors 330 are designed to move downward slowly to allow for shrinkage/settling of the wall 397. If the wall 297 attempts to move downward faster than the speed the connectors 330 are designed for, the connectors 330 will slow down the downward movement of the wall. The connectors 330 are mounted in the downward orientation as shown to slow down or resist the downward/compressive forces in the structure and channel those forces to the tie rods 320, turning the tie rods into both a tension and compression member instead of a tension member only.

Referring to FIGS. 36 and 37, the upper connector 330 shown in FIG. 36 has a greater travel length than the lower connector 330 shown in FIG. 37 to account for the cumulative shrinkage of the floors below.

Figure 38:
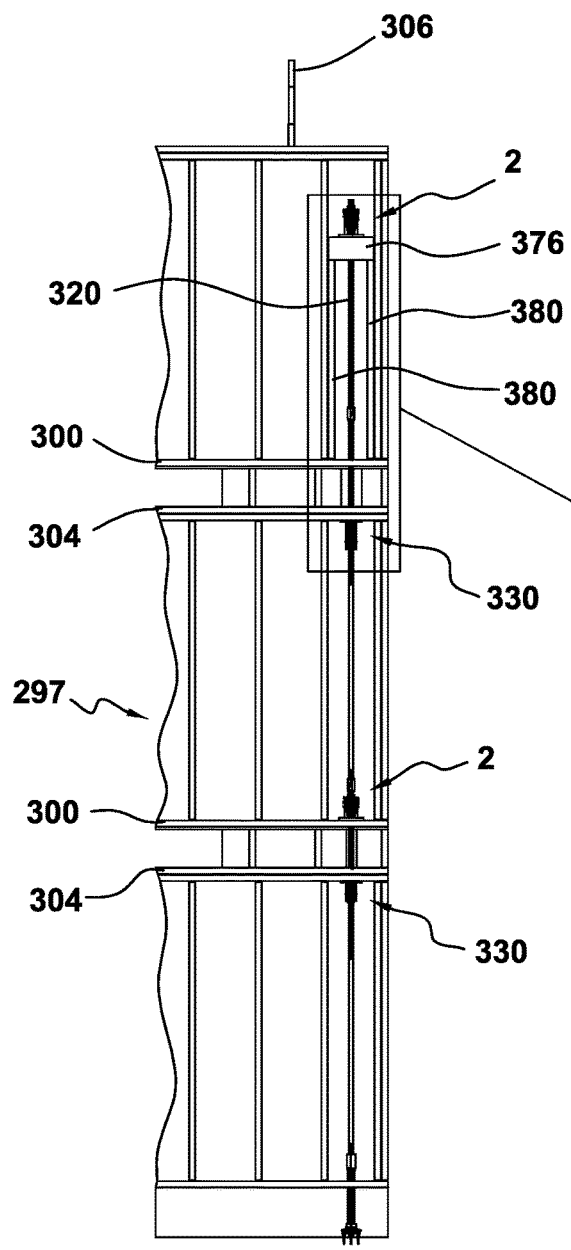
FIG. 38 is cross-sectional view of a three-level building wall incorporating multiple hold-down devices shown in FIG. 1.
Figure 39:
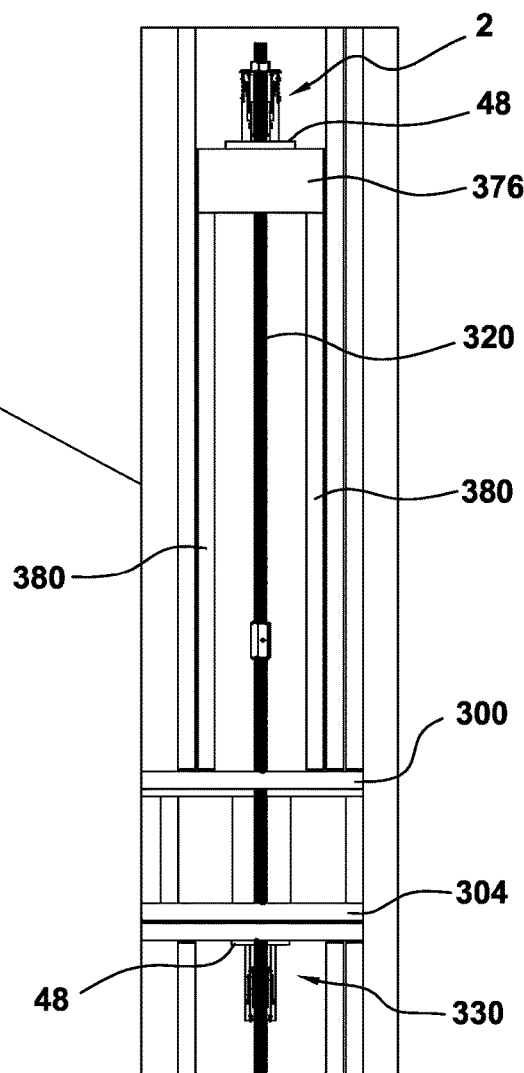
FIG. 39 is an enlarged view in cross-section of portions taken from FIG. 38.

Referring to FIGS. 38 and 39, the upper connector 2 shown in FIG. 39 is disposed on a cross member 376 supported on top of a pair of reinforcement studs 380. The connectors 330 function in the same way as those shown in FIG. 35, slowing down or resisting the downward/compressive forces in the structure and channel those forces to the tie rods 320, turning the tie rods into both a tension and compression member instead of a tension member only.

Figure 40:
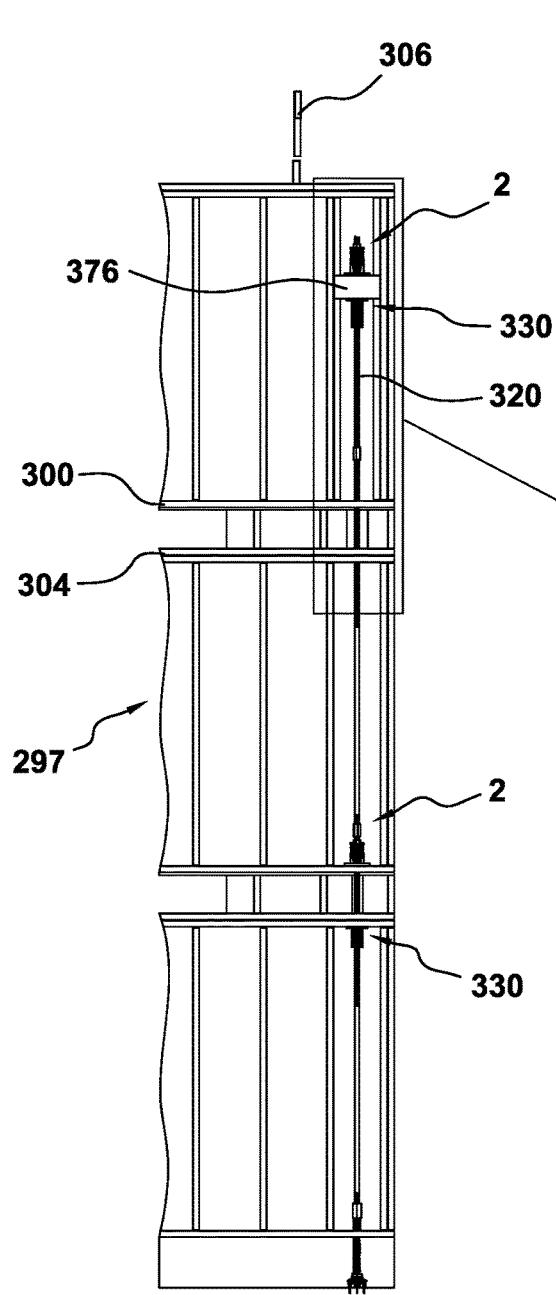
FIG. 40 is cross-sectional view of a three-level building wall incorporating multiple hold-down devices shown in FIG. 1.
Figure 41:
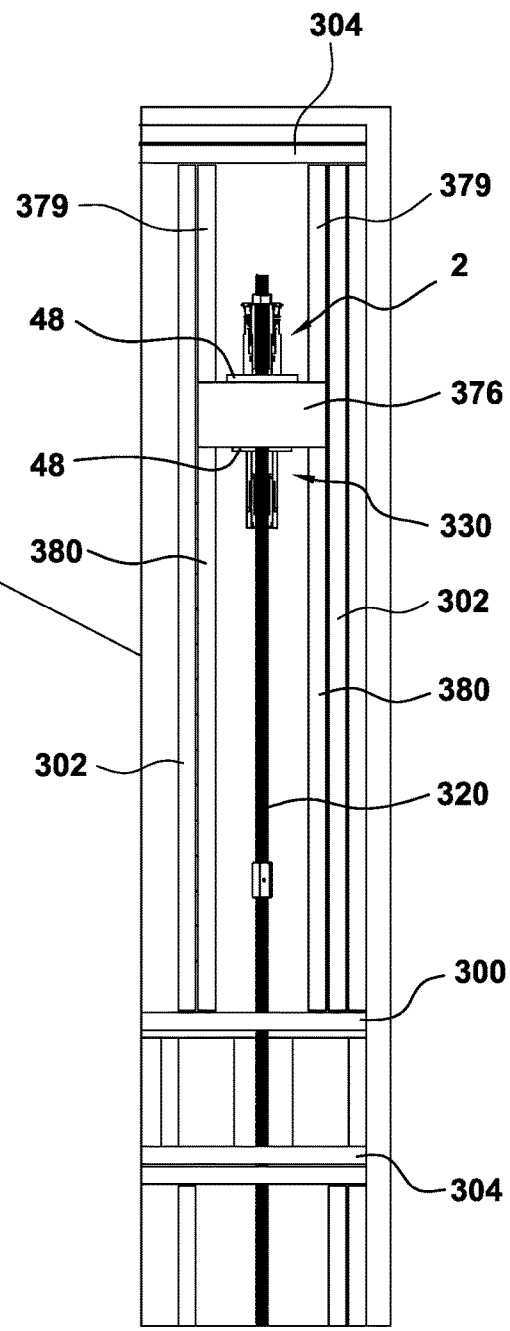
FIG. 41 is an enlarged view in cross-section of portions taken from FIG. 40.

Referring to FIGS. 40 and 41, the upper connector 330 is installed directly below the cross member or bridge member 376. The connectors 330 function to dampen the downward movement of the wall 297 as it shrinks. The cross member 376 is operably sandwiched between the reinforcement studs 380 and 379. The reinforcement studs 380 and 379 are operably attached to the studs 302 to help transfer the load from the tie rod 320 to the cross member 376 and the studs.

Figures 42, 43:
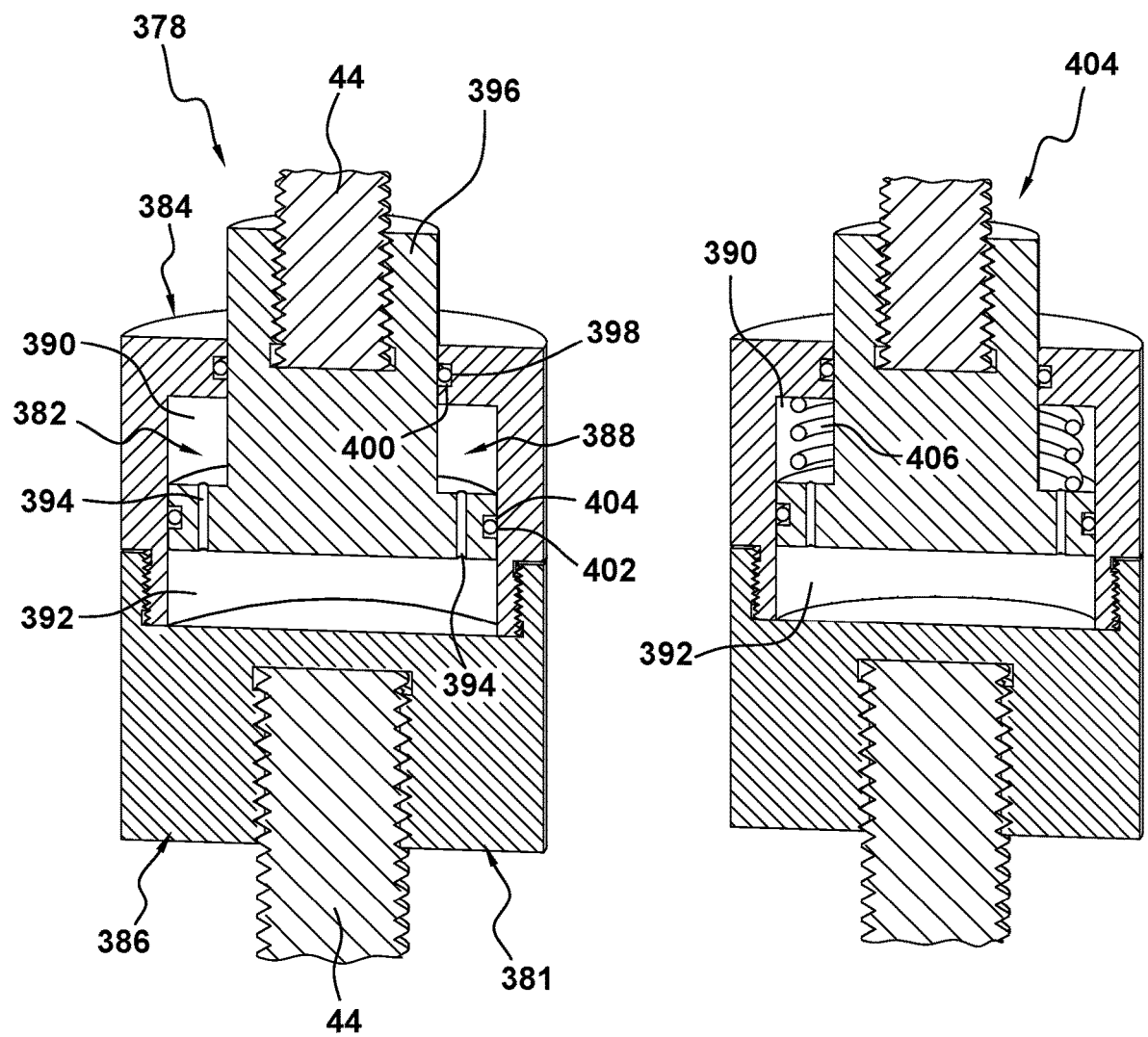
FIG. 42 is perspective cross-sectional view of a damping coupling embodying the present invention.
FIG. 43 is perspective cross-sectional view of a damping coupling similar to the damping coupling of FIG. 42, embodying the present invention.

Referring to FIG. 42, a damping coupling 378 is disclosed. The coupling 378 has a housing 381 with a closed internal chamber 382 filled with hydraulic fluid, such as mineral oi, water, etc. The housing 380 is preferably made of one body 384 threaded to another body 386. A piston 388 is disposed inside the chamber 382 and slidable between one end of the chamber 382 to the other end. The chamber 382 is divided into one chamber 390 on one side of the piston 388 and another chamber 392 on the other side of the piston 388. Passageways 394 allow the fluid in the chamber to flow from one chamber 390 to the other chamber 392 or vice versa. The piston 388 includes a rod portion 396 extending outside the housing 380 and threadedly attached to the tie rod 44 through a threaded opening in the rod portion 396. The other body 386 is threadedly attached to another tie rod 44 through a threaded opening in the body 386. A seal 398, such as an O-ring disposed inside an annular groove 400 in the body 384, seals the chamber 390 between the rod portion 396 and the body 384. A seal 402, such as an O-ring disposed in annular groove 404 in the piston 388, seals the chamber 390 from the other chamber 392 so that fluid flow is restricted only through the passageways 394.

The damping coupling 378 is a non-rigid coupling joining two tie rods 44 together. The tie rods 44 are allowed to move axially at a controlled rate within a designed maximum distance dictated by the length of the chamber 382. When the designed maximum distance is reached, when the piston 388 reaches the upper wall or bottom wall of the chamber 382, the coupling 378 becomes rigid in one direction. The passageways 394 allow the piston 388 to move through the fluid no faster than the fluid flow through the passageways 394, thereby providing a damping effect on the compressive or tensile forces acting on the tie rods 44. Damage due to excessive forces is advantageously avoided or lessened.

Referring to FIGS. 43, the damping coupling 378 is modified as damping coupling 404 with the addition of a spring 406 disposed within the chamber 390. The spring 406 advantageously generates a force to pull the two tie rods 44 together. The spring 406 further provides additional tensioning in the tie rods 44 as the wall shrinks.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A building wall, comprising:
   a) a first stud wall having a first bottom plate and a first top plate;
   b) a second stud wall disposed above the first stud wall, the second stud wall having a second bottom plate and a second top plate;
   c) a tie rod operably connected to a foundation, the tie rod extending through the first stud wall and the second stud wall;
   d) a first hydraulic connector disposed on the second bottom plate, the first hydraulic connector being attached to the tie rod; and
   e) a second hydraulic connector disposed on an underside of the first top plate to operably bear on the underside, the second hydraulic connector being attached to the tie rod.

2. A building wall, comprising:
   a) a first stud wall;
   b) a tie rod operably connected to a foundation, the tie rod extending through the first stud wall; and
   c) a first hydraulic connector operably bearing on top of a first horizontal wall member in the first stud wall, the first hydraulic connector being operably attached to the tie rod to counter uplift forces on the first horizontal member, the tie rod extending through the first hydraulic connector.

3. The building wall as in claim 2, wherein the first hydraulic connector comprises:
   a) a first chamber and a second chamber;
   b) a controlled passageway communicating between the first chamber and the second chamber to allow fluid flow between the first chamber and the second chamber in response to relative motion between the first horizontal wall member and the tie rod; and c) a first piston disposed between the first chamber and the second chamber.

4. The building wall as in claim 3, wherein:
a) the first hydraulic connector comprises a first inner cylindrical body disposed within a first outer cylindrical body;
b) the first inner cylindrical body is threaded to the tie rod; and
c) the first outer cylindrical body is operably attached to the first horizontal wall member.

5. The building wall as in claim 2, wherein:
a) the first hydraulic connector comprises a first inner cylindrical body disposed within a first outer cylindrical body; and
b) a first spring is operably attached to the first inner cylindrical body and the first outer cylindrical body to urge relative motion between the first inner cylindrical body and the first outer cylindrical body.

6. The building wall as in claim 2, wherein the first horizontal wall member comprises a bottom plate in the first stud wall.

7. The building wall as in claim 2, wherein the first horizontal wall member comprises a top plate in the first stud wall.

8. The building wall as in claim 2, wherein the first horizontal wall member comprises a cross member in the first stud wall.

9. The building wall as in claim 8, and further comprising a second hydraulic connector operably bearing on an underside of the cross member in the first stud wall, the second hydraulic connector being operably attached to the tie rod and operably bearing on the underside of the cross member to dampen relative motion between the tie rod and the cross member.

10. The building wall as in claim 2, and further comprising:
a) a second stud wall disposed below the first stud wall; and
b) a second hydraulic connector operably bearing on an underside of a second horizontal wall member in the second stud wall, the second hydraulic connector being operably attached to the tie rod and operably bearing on the underside of the second horizontal wall member to dampen relative motion between the tie rod and the second horizontal wall member.

11. The building wall as in claim 10, wherein the second hydraulic connector comprises:
a) a third chamber and a fourth chamber; and
b) a second passageway communicating between the third chamber and the fourth chamber to allow fluid flow between the third chamber and the fourth chamber in response to relative motion between the second horizontal wall member and the tie rod.

12. The building wall as in claim 11, wherein:
a) the second hydraulic connector comprises a second piston disposed between the third chamber and the fourth chamber, the second piston being operably attached to the tie rod; and
b) the second passageway is disposed in the second piston.

13. The building wall as in claim 12, wherein:
a) the second hydraulic connector comprises a second inner cylindrical body disposed within a second outer cylindrical body; and
b) the third chamber and the fourth chamber are disposed between an outer wall surface of the second inner cylindrical body and an inner wall surface of the second outer cylindrical body.

14. The building wall as in claim 13, wherein the second piston forms a part of the second inner cylindrical body.

15. The building wall as in claim 13, wherein:
a) the tie rod is operably attached to the second inner cylindrical body; and
b) the second piston is operably attached to the second inner cylindrical body.

16. The building wall as in claim 15, wherein the first inner cylindrical body includes a threaded opening for attachment to the tie rod.

17. The building wall as in claim 15, wherein a second spring is operably attached to the second inner cylindrical body and the second outer cylindrical body to urge relative motion between the second inner cylindrical body and the second outer cylindrical body.

18. The building wall as in claim 17, wherein the second spring is disposed inside the second outer cylindrical body.

19. The building wall as in claim 17, wherein the second spring is disposed inside the second chamber.

20. The building wall as in claim 10, wherein the second horizontal wall member comprises a top plate in the second stud wall.

21. The building wall as in claim 10, wherein:
a) the first horizontal wall member comprises a bottom plate in the first stud wall; and
b) the second horizontal wall member comprises a top plate in the second stud wall.

22. The building wall as in claim 21, wherein the first stud wall is immediately above the second stud wall.

23. The building wall as in claim 13, wherein:
a) the second outer cylindrical body comprises a first cylindrical body and a second cylindrical body; and
b) the first cylindrical body is threaded to the second cylindrical body.

* * * * *